US012558654B2

(12) United States Patent
Zhou et al.

(10) Patent No.: US 12,558,654 B2
(45) Date of Patent: Feb. 24, 2026

(54) HOLLOW FIBER MEMBRANES WITH POLYDIORGANOSILOXANE POLYOXAMIDE COPOLYMER SKIN LAYER AND METHODS OF MAKING AND USING THE SAME

(71) Applicant: 3M INNOVATIVE PROPERTIES COMPANY, St. Paul, MN (US)

(72) Inventors: Jinsheng Zhou, Woodbury, MN (US); Kuan-Yin Lin, Woodbury, MN (US); James C. DeLozier, Fort Mill, SC (US); David S. Hays, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 623 days.

(21) Appl. No.: 17/756,338

(22) PCT Filed: Nov. 21, 2020

(86) PCT No.: PCT/IB2020/060996
§ 371 (c)(1),
(2) Date: May 23, 2022

(87) PCT Pub. No.: WO2021/105838
PCT Pub. Date: Jun. 3, 2021

(65) Prior Publication Data

US 2022/0410078 A1 Dec. 29, 2022

Related U.S. Application Data

(60) Provisional application No. 62/939,987, filed on Nov. 25, 2019.

(51) Int. Cl.
*B01D 69/02* (2006.01)
*B01D 53/22* (2006.01)
(Continued)

(52) U.S. Cl.
CPC .......... *B01D 69/02* (2013.01); *B01D 53/228* (2013.01); *B01D 67/0027* (2013.01);
(Continued)

(58) Field of Classification Search
CPC .. B01D 69/02; B01D 53/228; B01D 67/0027; B01D 67/0083; B01D 69/08;
(Continued)

(56) References Cited

U.S. PATENT DOCUMENTS 3,873,653 A * 3/1975 Meinecke .............. D01D 5/247 264/41
4,772,391 A * 9/1988 Baker .................... B01D 69/08 264/41
(Continued)

FOREIGN PATENT DOCUMENTS

EP 1043035 B1 6/2003
JP S6245318 A 2/1987
(Continued)

OTHER PUBLICATIONS

Bae, "CO2/N2 Separations with Mixed-Matrix Membranes Containing Mg2(dobdc) Nanocrystals", Electronic Supplementary Material (ESI) for Energy & Environmental Science, the Royal Society of Chemistry, 2013, pp. 1-14.
(Continued)

*Primary Examiner* — Dung H Bui
(74) *Attorney, Agent, or Firm* — Philip P. Soo

(57) ABSTRACT

Hollow fiber membranes, membrane contactors, and related production and use methods. The asymmetric hollow fiber membranes include a porous substrate having a multiplicity of pores and including at least one semi-crystalline thermoplastic polyolefin (co)polymer. A skin layer including at least one polydiorganosiloxane polyoxamide copolymer overlays the porous substrate. The skin layer is less porous
(Continued)

than the porous substrate and forms an outer surface of the asymmetric hollow fiber membrane, while the porous substrate forms an inner surface of the hollow fiber membrane. The skin layer is preferably nonporous.

19 Claims, 4 Drawing Sheets

(51) Int. Cl.

| | |
|---|---|
| ***B01D 67/00*** | (2006.01) |
| ***B01D 69/08*** | (2006.01) |
| ***B01D 69/10*** | (2006.01) |
| ***B01D 69/12*** | (2006.01) |
| ***B01D 71/26*** | (2006.01) |
| ***B01D 71/56*** | (2006.01) |
| ***B01D 71/70*** | (2006.01) |
| ***B01D 71/76*** | (2006.01) |

(52) U.S. Cl.
CPC ......... *B01D 67/0083* (2013.01); *B01D 69/08* (2013.01); *B01D 69/10* (2013.01); *B01D 69/12* (2013.01); *B01D 71/261* (2022.08); *B01D 71/262* (2022.08); *B01D 71/56* (2013.01); *B01D 71/70* (2013.01); *B01D 71/76* (2013.01); *B01D 2053/224* (2013.01); *B01D 2317/04* (2013.01); *B01D 2325/022* (2013.01); *B01D 2325/02833* (2022.08); *B01D 2325/02834* (2022.08); *B01D 2325/04* (2013.01)

(58) Field of Classification Search
CPC ...... B01D 69/10; B01D 69/12; B01D 71/261; B01D 71/262; B01D 71/56; B01D 71/70; B01D 71/76; B01D 2053/224; B01D 2317/04; B01D 2325/022; B01D 2325/02833; B01D 2325/02834; B01D 2325/04; B01D 2315/22; B01D 2325/0231; B01D 69/1212; Y02C 20/40
See application file for complete search history.

(56) References Cited

U.S. PATENT DOCUMENTS

| | | | | | |
|---|---|---|---|---|---|
| 5,006,247 | A * | 4/1991 | Dennison | B01D 71/56 | 264/212 |
| 5,096,585 | A * | 3/1992 | Nguyen | B01D 67/0009 | 210/500.41 |
| 5,181,940 | A * | 1/1993 | Bikson | B01D 53/22 | 264/177.17 |
| 5,698,161 | A | 12/1997 | Montoya | | |
| 6,447,679 | B1 * | 9/2002 | Watari | B01D 19/0031 | 210/500.36 |
| 6,497,752 | B1 * | 12/2002 | Kessler | B01D 69/02 | 96/10 |
| 6,797,212 | B2 | 9/2004 | Montoya | | |
| 7,371,464 | B2 | 5/2008 | Sherman et al. | | |
| 7,501,184 | B2 | 3/2009 | Leir et al. | | |
| 8,546,507 | B2 | 10/2013 | Lavallee et al. | | |
| 8,557,159 | B2 | 10/2013 | Montoya | | |
| 2001/0006160 | A1 * | 7/2001 | Niklas | B01D 71/68 | 210/691 |
| 2002/0195385 | A1 | 12/2002 | Cho | | |
| 2003/0027908 | A1 * | 2/2003 | Dotson | C07C 51/412 | 524/394 |
| 2007/0177272 | A1 * | 8/2007 | Benson | B32B 27/08 | 359/584 |
| 2007/0177273 | A1 * | 8/2007 | Benson | B32B 27/36 | 359/584 |
| 2011/0127219 | A1 | 6/2011 | Hoelzl et al. | | |
| 2014/0150287 | A1 | 6/2014 | Ahn et al. | | |
| 2015/0375172 | A1 | 12/2015 | Muehlinghaus et al. | | |
| 2016/0001237 | A1 | 1/2016 | Halbach | | |
| 2016/0177095 | A1 | 6/2016 | Sherman et al. | | |
| 2016/0228297 | A1 | 8/2016 | Liu et al. | | |
| 2016/0271571 | A1 * | 9/2016 | Liu | B01D 69/125 | |
| 2017/0021311 | A1 * | 1/2017 | Berzinis | B01D 67/00165 | |
| 2018/0264399 | A1 * | 9/2018 | Deng | B01D 69/148 | |
| 2019/0048152 | A1 * | 2/2019 | Humpal | C08J 3/28 | |
| 2019/0160436 | A1 * | 5/2019 | Qiu | B01D 71/56 | |
| 2020/0101416 | A1 * | 4/2020 | Liu | B01D 69/142 | |
| 2021/0331120 | A1 * | 10/2021 | Lin | B01D 69/088 | |
| 2022/0062816 | A1 * | 3/2022 | Lin | B41J 2/19 | |
| 2022/0410078 | A1 * | 12/2022 | Zhou | B01D 69/02 | |

FOREIGN PATENT DOCUMENTS

| | | | |
|---|---|---|---|
| JP | H03143531 | A | 6/1991 |
| JP | 2009095829 | A | 5/2009 |
| WO | 2007075317 | A1 | 7/2007 |
| WO | 2009002668 | A3 | 12/2008 |
| WO | 2013022913 | A1 | 2/2013 |
| WO | 2013096530 | A1 | 6/2013 |
| WO | 2020136560 | A1 | 7/2020 |
| WO | 2020136568 | A1 | 7/2020 |

OTHER PUBLICATIONS

International Search Report for PCT International Application No. PCT/IB20/60996, mailed on Mar. 25, 2021, 2 pages.

Ito, "Removal of dissolved oxygen using non-porous hollow-fiber membranes", Journal of Membrane Science, Jun. 1998, vol. 145, No. 1, pp. 111-117.

Mohr, "Surface fluorination of composite membranes. Part I. Transport properties", Journal of Membrane Science, Jan. 1991, vol. 55, No. 1-1, pp. 131-138.

Puleo, "Gas sorption and transport in semicrystalline poly(4-methyl-1-pentene)", Polymer, Jul. 1989, vol. 30, No. 7, pp. 1357-1366.

Seven, "Nucleating agents for high-density polyethylene—A review", Polymer Engineering & Science, May 2016, vol. 56, No. 5, pp. 541-554.

Zhao, "Hollow Fiber Membrane Dehumidification Device for Air Conditioning System", Membranes, 2015, vol. 5, No. 4, pp. 722-738.

* cited by examiner

HOLLOW FIBER MEMBRANES WITH POLYDIORGANOSILOXANE POLYOXAMIDE COPOLYMER SKIN LAYER AND METHODS OF MAKING AND USING THE SAME

CROSS REFERENCE TO RELATED APPLICATIONS

This application is a national stage filing under 35 U.S.C. 371 of PCT/IB2020/060996, filed Nov. 21, 2020, which claims the benefit of U.S. Application No. 62/939,987, filed Nov. 25, 2019, the disclosure of which is incorporated by reference in its/their entirety herein.

TECHNICAL FIELD

The present disclosure relates to hollow fiber membranes and gas separation articles made using such hollow fiber membranes, as well as methods of making and using such hollow fiber membranes and gas separation articles.

BACKGROUND

Microporous hollow fibers can be used to separate components from a fluid stream on the basis of size, phase, charge, and the like. Microporous hollow fibers often employ materials having a controlled porosity and pore size on the order of a few micrometers, and can have many uses including, for example, separation, filtration, diffusion, and barrier applications. These broad applications have been practically applied in medical devices, electrochemical devices, chemical processing devices, pharmaceutical devices, and water purification, to name a few.

SUMMARY

The functionality of a microporous hollow fiber membrane is often a complex function of the particular end-use application, the structure of the hollow fiber (e.g., the hollow fiber diameter, wall thickness, porosity, pore size, and pore tortuosity), and the composition or chemical nature of the asymmetric hollow fiber membrane surfaces. Often, these and other variables of the hollow fiber must be tailored to the particular end-use application. For example, a membrane with a gas permeable separation layer may be used to provide selective gas/gas and/or gas/liquid passage.

Asymmetric microporous hollow fiber membranes, allowing the selective passage of dissolved gases and blockage of liquid water or other aqueous liquids, may be advantageously used in a membrane contactor to achieve gas/liquid separation in certain applications, such as the degassing of aqueous printing inks during printing, or the separation of dissolved gases such as carbon dioxide or methane from aqueous brines used to enhance petroleum recovery.

Membrane contactors useful for gas/liquid separation applications may be advantageously fabricated using hydrophobic asymmetric microporous hollow fiber membranes. Since the membranes are hydrophobic and have very small pores, liquid will not easily pass through the pores and is retained at the inner or outer membrane surface of the hollow fiber membrane. The hydrophobic hollow fiber membrane surface acts to separate the gas phase from the liquid phase without dispersion. Such membrane contactors may be used advantageously to selectively separate gasses such as air, carbon dioxide, or methane from an aqueous liquid, such as water or an aqueous brine.

At least certain known microporous hollow fiber membranes have been found less than fully satisfactory in some particular gas/liquid separation applications, under certain operating conditions. Accordingly, a need exists for an improved hollow fiber membrane contactor having improved design or operating characteristics over known membrane contactors designed for particular end-use applications.

For example, in view of environmental concerns, the desire to separate components, the need to protect equipment, and/or efforts to improve process efficiency, it is often necessary or desirable to, for example, remove one or more components or contaminants from an effluent stream so that the component or contaminant does not pollute the environment, negatively affect equipment, or so that it may be recycled. Existing industrial processes frequently must be upgraded to reduce environmental emissions and/or increase efficiency. Therefore, a need often arises for a process and system that can be economically retrofit to an existing plant to reduce emissions, protect equipment, recycle, or improve efficiency.

Thus, there also is a need for improved microporous hollow fiber membrane materials so that they may be used in a wider spectrum of applications, may perform better for particular purposes, under certain operating conditions, or the like. A need also exists for an improved membrane contactor having improved design or characteristics over known membrane contactors, for use in gas/liquid separation in certain applications, such as the degassing of aqueous printing inks during printing, or the separation of dissolved gases such as carbon dioxide or methane from aqueous brines used to enhance petroleum recovery, and the like. It is to the provision of an asymmetric microporous hollow fiber membrane device meeting these or other needs that at least certain exemplary embodiments of the present disclosure are directed.

Briefly, in one aspect, the present disclosure describes an asymmetric hollow fiber membrane including a porous substrate having a multiplicity of pores, and a skin layer overlaying the porous substrate. The porous substrate comprises at least one semi-crystalline thermoplastic polyolefin (co)polymer; and the skin layer comprises at least one polydiorganosiloxane polyoxamide copolymer comprising at least two repeat units of Formula I:

I

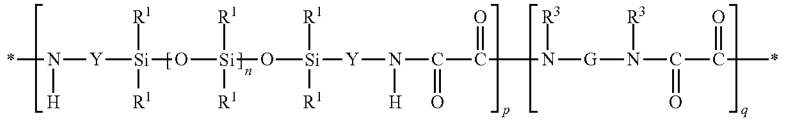

wherein:

each $R^1$ is independently an alkyl, haloalkyl, aralkyl, alkenyl, aryl, or aryl substituted with an alkyl, alkoxy, or halo;

each Y is independently an alkylene, aralylene, or a combination thereof; G is a divalent residue equal to a diamine of formula $R^3HN\text{-}G\text{-}NHR^3$ minus the two $—NHR^3$ groups;

$R^3$ is hydrogen or alkyl or $R^3$ taken together with G and to the nitrogen to which they are both attached form a heterocyclic group;

n is independently an integer of 0 to 1500;

p is an integer of 1 to 10; and q is an integer of 1 or greater.

Preferably, n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer. In such embodiments, n, p and q are selected so that the polydiorganosiloxane block comprises no more than 99.9 wt %, 99.8 wt %, 99.7 wt % or even 99.5 wt % of the polydiorganosiloxane polyoxamide copolymer.

The semi-crystalline thermoplastic polyolefin (co)polymer is derived by polymerizing one or more branched or linear alpha olefin monomers selected from the group consisting of ethylene, propylene, 1-butene, 1-pentene, 2-methyl-1-pentene, 3-methyl-1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. The semi-crystalline thermoplastic polyolefin (co)polymer preferably comprises polyethylene, polypropylene, or a combination thereof, more preferably, the polyolefin (co)polymer consists of or consists essentially of polypropylene.

In a further aspect, the disclosure describes a method of using any of the foregoing separation articles, wherein the separation article is used to separate a gas phase from a liquid phase. In some embodiments, the gas phase includes $N_2$, $O_2$, $CO_2$, $CH_4$, or a combination thereof. In certain embodiments, the gas phase includes water vapor. In such embodiments, the separation article may be useful in humidification or dehumidification of the gas phase. In certain embodiments, the gas phase includes one or more volatile organic compounds. In such embodiments, the separation article may be useful in removing the volatile organic compounds from either the gas phase or the liquid phase.

In some embodiments, the liquid phase includes liquid water. Optionally, the liquid phase is an aqueous printing ink, or an aqueous brine. In some embodiments, the liquid phase includes one or more organic compounds. For example, the liquid phase may contain one or more organic alcohol, ketone, ether, ester, or hydrocarbon solvent. In some such embodiments, the liquid phase may include one or more surfactants. For example, the liquid phase may include one or more nonionic, anionic, cationic, or amphoteric surfactants.

In a final aspect, the disclosure describes a method of making an asymmetric hollow fiber membrane including providing at least one substrate resin and at least one skin layer resin, co-extruding the substrate resin and the skin layer resin to form an asymmetric hollow fiber membrane precursor, and stretching the asymmetric hollow fiber membrane precursor to form an asymmetric hollow fiber membrane having a skin layer made of the skin layer resin overlaying a porous substrate made of the substrate resin and having a multiplicity of pores.

The substrate resin comprises at least one semi-crystalline thermoplastic polyolefin (co)polymer; and the skin layer comprises a polydiorganosiloxane polyoxamide copolymer comprising at least two repeat units of Formula I:

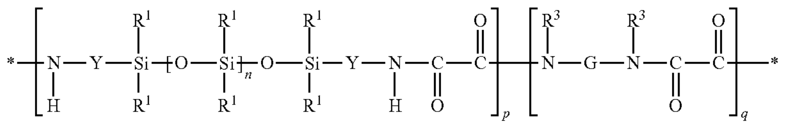

I

In certain presently-preferred embodiments, the multiplicity of pores includes micropores. In some exemplary embodiments, the micropores have a diameter of from 0.01 micrometer to 1.0 micrometer. In other embodiments, the micropores have a diameter of from 0.02 micrometer to 0.5 micrometer. In further exemplary embodiments, the asymmetric hollow fiber membrane exhibits a porosity of from 5% to 80%. In other embodiments, the hollow fiber membrane exhibits a porosity of from 10% to 50%.

In another aspect, the present disclosure describes a separation article comprising a multiplicity of the asymmetric hollow fiber membranes according to any of the foregoing embodiments. In some exemplary embodiments, the multiplicity of asymmetric hollow fiber membranes is arranged in an array, which may be formed by knitting. Optionally, the array is pleated, folded, or rolled into a cylinder or a cassette.

In further exemplary embodiments, the separation article is selectively permeable to $CO_2$ over $N_2$ or $CH_4$. Preferably, the separation article exhibits a $CO_2/N_2$ selectivity of at least 8. In other exemplary embodiments, the filtration article is selectively permeable to $O_2$ over $N_2$.

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN\text{-}G\text{-}NHR^3$ minus the two $—NHR^3$ groups;

$R^3$ is hydrogen or alkyl or $R^3$ taken together with G and to the nitrogen to which they are both attached form a heterocyclic group;

n is independently an integer of 0 to 1500;

p is an integer of 1 to 10; and q is an integer of 1 or greater.

Preferably, n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer. In such embodiments, n, p and q are selected so that the polydiorganosiloxane block comprises no more than 99.9 wt %, 99.8 wt %, 99.7 wt % or even 99.5 wt % of the polydiorganosiloxane polyoxamide copolymer.

The semi-crystalline thermoplastic polyolefin (co)polymer is derived by polymerizing one or more branched or linear alpha olefin monomers selected from the group consisting of ethylene, propylene, 1-butene, 1-pentene, 2-methyl-1-pentene, 3-methyl-1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof. The semi-crystalline thermoplastic polyolefin (co)polymer preferably comprises polyethylene, polypropylene, or a combination thereof, more preferably, the polyolefin (co)polymer consists of or consists essentially of polypropylene.

In some exemplary embodiments, the skin layer resin is substantially free of any pore-forming material in an amount effective to cause pore formation. In some such embodiments, co-extruding the substrate resin and the skin layer resin to form an asymmetric hollow fiber membrane precursor includes co-extruding the substrate resin and the skin layer resin through an annular co-extrusion die to form the asymmetric hollow fiber membrane precursor.

In some embodiments, the skin layer forms the inside lumen of the hollow fiber. In certain embodiments, the skin layer is positioned between two substrate layers.

In certain exemplary embodiments, the method further includes annealing the asymmetric hollow fiber membrane precursor. Preferably, annealing the asymmetric hollow fiber membrane precursor includes annealing the asymmetric hollow fiber membrane precursor prior to stretching the asymmetric hollow fiber membrane precursor.

In some exemplary embodiments, the method further includes treating the asymmetric hollow fiber membrane precursor by exposing the PDSP copolymer skin by exposure to actinic radiation, for example exposure to ultraviolet, visible or infrared radiation, or exposure to ionizing radiation, for example exposure to electron beam radiation or gamma radiation, in order to react and/or chemically cross-link the PDSP copolymer, optionally with one or more radiation curable materials.

Various unexpected results and advantages may be obtained in exemplary embodiments of the disclosure. One such advantage of certain exemplary embodiments of the present disclosure is that the asymmetric hollow fiber membrane may achieve both very high gas flux and high $CO_2/N_2$ selectivity compared to other types of membranes. Exemplary hollow fiber membranes according to the present disclosure offer superior gas permeation rates for $CO_2$ up to 784 GPU and $CO_2/N_2$ selectivity up to 11.2. This gas permeability performance is 80-100 times higher than known poly(4-methyl-1-pentene) (PMP) thermally induced phase separation (TIPS) hollow fiber membranes. The asymmetric hollow fiber membranes of the present disclosure also may exhibit uniform pore size and high porosity compared to other types of membranes.

The hollow fibers also show good skin integrity as indicated by their high $CO_2/N_2$ selectivity. It is also very surprising to see that there is no layer delamination observed between the polydiorganosiloxane polyoxamide (PDSP) copolymer skin layer and the polyolefin (e.g. polypropylene, PP) substrate layer after hot stretching. The hollow fibers exhibit good mechanical strength and are easily handled in the post extrusion stretching processes used to form the porous hollow fibers.

In addition, SEM images showed the PDSP skin layer thickness can be as low as 2.6 μm after stretching, which is in clear contrast to hollow fiber membranes made with silicone skin layers, which generally exhibit a wall thickness over 30 μm.

Furthermore, polydiorganosiloxane polyoxamide (PDSP) copolymers are thermally stable to temperatures greater than 300° C. due to the oxamide linkages, which is differentiated from other silicone thermoplastic elastomers (TPE) like silicone polyurea (SPU). SPU becomes less stable at temperatures above 200° C. Such high thermal stability adds processing condition tolerance with substrate layer materials like PP at processing temp up to 220° C.

Additionally, exemplary hollow fiber membranes according to the present disclosure may exhibit the following advantages:

1) much higher loop strength of the fibers compared to pure silicone hollow fiber membranes because of the supported substrate;
2) lower raw material cost since costly PDSP skin contributes to 15% of total materials or less;
3) high production rate as characterized by dry-stretching process;
4) process simplicity because no curing, cleaning or washing step is required.

LISTING OF EXEMPLARY EMBODIMENTS

A. An asymmetric hollow fiber membrane comprising:

a porous substrate having a plurality of pores, wherein the porous substrate comprises at least one semi-crystalline thermoplastic polyolefin (co)polymer; and a skin layer overlaying the porous substrate, wherein the skin layer comprises at least one polydiorganosiloxane polyoxamide copolymer comprising at least two repeat units of Formula I:

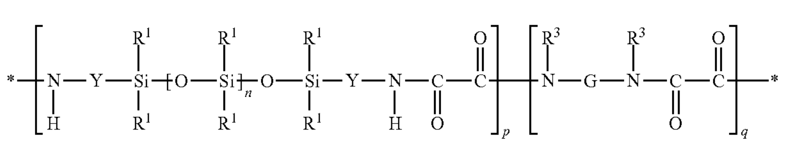

I wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN\text{-}G\text{-}NHR^3$ minus the two —$NHR^3$ groups;

$R^3$ is hydrogen or alkyl or $R^3$ taken together with G and to the nitrogen to which they are both attached form a heterocyclic group;

n is independently an integer of 0 to 1500;

p is an integer of 1 to 10; and q is an integer of 1 or greater.

B. The asymmetric hollow fiber membrane of Embodiment A, wherein n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer, and optionally no more than 99.9 wt %, 99.8 wt %, 99.7 wt % or even 99.5 wt % of the polydiorganosiloxane polyoxamide copolymer.

C. The asymmetric hollow fiber membrane of Embodiment A or B, wherein at least 50 percent of the $R^1$ groups are methyl, optionally wherein each $R^1$ is methyl.

D. The asymmetric hollow fiber membrane of any preceding Embodiment, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

E. The asymmetric hollow fiber membrane of any preceding Embodiment, wherein Y is an alkylene having 1 to 4 carbon atoms.

F. The asymmetric hollow fiber membrane of any preceding Embodiment, wherein n is at least 40.

G. The asymmetric hollow fiber membrane of any preceding Embodiment, wherein p is 1-4.

H. The asymmetric hollow fiber membrane of any preceding Embodiment, wherein G is an alkylene, heteroalkylene, arylene, aralkylene, polydiorganosiloxane, or a combination thereof.

I. The asymmetric hollow fiber membrane of any preceding Embodiment, wherein $R^3$ is H or methyl.

J. The asymmetric hollow fiber membrane of any preceding Embodiment, wherein Y is an alkylene having 3 carbon atoms, $R^1$ is methyl, $R^3$ is H, n is 190 and p is 1.

K. The asymmetric hollow fiber membrane of any preceding Embodiment, wherein the semi-crystalline thermoplastic polyolefin (co)polymer is derived by polymerizing one or more branched or linear alpha olefin monomers selected from the group consisting of ethylene, propylene, 1-butene, 1-pentene, 2-methyl-1-pentene, 3-methyl-1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof.

L. The asymmetric hollow fiber membrane of any preceding Embodiment, wherein the semi-crystalline thermoplastic polyolefin (co)polymer comprises polyethylene, polypropylene, or a combination thereof.

M. The asymmetric hollow fiber membrane of any preceding Embodiment, wherein the plurality of pores comprises a plurality of micropores.

N. The asymmetric hollow fiber membrane of any preceding Embodiment, wherein the plurality of micropores has a diameter of from 0.01 micrometer to 1.0 micrometer, optionally wherein the plurality of micropores has a diameter of from 0.02 micrometer to 0.5 micrometer.

O. The asymmetric hollow fiber membrane of any preceding Embodiment, wherein the asymmetric hollow fiber membrane exhibits a porosity of from 5% to 80%, optionally wherein the asymmetric hollow fiber membrane exhibits a porosity of from 10% to 50%.

P. The asymmetric hollow fiber membrane of any preceding Embodiment, wherein the skin layer is less porous than the porous substrate and comprises an outer sheath surface of the asymmetric hollow fiber membrane, optionally wherein the porous substrate comprises an inner lumen surface of the asymmetric hollow fiber membrane.

Q. The asymmetric hollow fiber membrane of Embodiment P, wherein the skin layer is nonporous.

R. The asymmetric hollow fiber membrane of any preceding Embodiment, wherein the porous substrate further includes a nucleating agent in an amount effective to achieve nucleation.

S. The asymmetric hollow fiber membrane of any preceding Embodiment, wherein the skin layer has a thickness of less than 20 micrometers, optionally wherein the skin layer has a thickness of less than 5 micrometers.

T. The asymmetric hollow fiber membrane of any preceding Embodiment, wherein the porous substrate has a thickness of from 5 micrometers to 200 micrometers, optionally wherein the porous substrate has a thickness of from 10 micrometers to 100 micrometers.

U. The asymmetric hollow fiber membrane of Embodiment T, wherein the porous substrate has a thickness of from 20 micrometers to 50 micrometers, optionally wherein the porous substrate has a thickness of from 5 micrometers to 10 micrometers.

V. The asymmetric hollow fiber membrane of any preceding Embodiment, wherein the asymmetric hollow fiber membrane is a non-homogeneous asymmetric hollow fiber membrane.

W. The asymmetric hollow fiber membrane of any preceding Embodiment, wherein the skin layer completely covers the porous substrate.

X. A separation article comprising a plurality of the asymmetric hollow fiber membranes according to any preceding Embodiment.

Y. The separation article of Embodiment X, wherein the plurality of the asymmetric hollow fiber membranes is arranged in an array (by for example knitting), optionally wherein the array is pleated, folded, or rolled into a cylinder or a cassette.

Z. The separation article of claim 15, wherein the separation article is selectively permeable to $CO_2$ over $N_2$, $CO_2$ over $CH_4$, water vapor over air, or one or more volatile organic compounds over air.

AA. The separation article of Embodiment Z, wherein the separation article exhibits a $CO_2/N_2$ selectivity of at least 8.

BB. The separation article of Embodiment X or Y, wherein the filtration article is selectively permeable to $O_2$ over $N_2$.

CC. A method of using the separation article of any one of Embodiment X, Y, Z, AA or BB, wherein the separation article is used to separate a gas phase from a liquid phase.

DD. The method of using of Embodiment CC, wherein the gas phase comprises $N_2$, $O_2$, $CO_2$, $CH_4$, or a combination thereof.

EE. The method of Embodiment CC or DD, wherein the liquid phase comprises water, optionally wherein the liquid phase is an aqueous printing ink, or an aqueous brine.

FF. A method of making an asymmetric hollow fiber membrane comprising:

providing a substrate resin and a skin layer resin, the substrate resin comprising at least one semi-crystalline thermoplastic polyolefin (co)polymer, and the skin layer resin comprising at least one polydiorganosiloxane polyoxamide copolymer comprising at least two repeat units of Formula I:

I

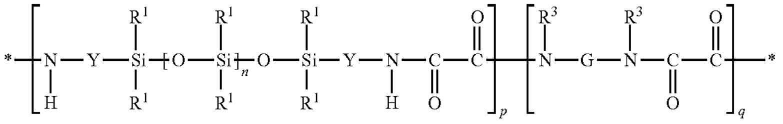

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN$-G-$NHR^3$ minus the two —$NHR^3$ groups;

$R^3$ is hydrogen or alkyl or $R^3$ taken together with G and to the nitrogen to which they are both attached form a heterocyclic group;

n is independently an integer of 0 to 1500;

p is an integer of 1 to 10; and q is an integer of 1 or greater;

co-extruding the substrate resin and the skin layer resin to form an asymmetric hollow fiber membrane precursor; and stretching the asymmetric hollow fiber membrane precursor to form an asymmetric hollow fiber membrane having a substantially nonporous skin layer comprised of the skin layer resin overlaying a porous substrate comprised of the substrate resin, wherein the porous substrate comprises a plurality of pores.

GG. The method of Embodiment FF, wherein n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer, and optionally no more than 99.9 wt %, 99.8 wt %, 99.7 wt % or even 99.5 wt % of the polydiorganosiloxane polyoxamide copolymer.

HH. The method of Embodiment FF or GG, wherein co-extruding the substrate resin and the skin layer resin to form an asymmetric hollow fiber membrane precursor includes co-extruding the substrate resin and the skin layer resin through an annular co-extrusion die to form the asymmetric hollow fiber membrane precursor.

II. The method of any one of Embodiments FF, GG or HH, further including annealing the asymmetric hollow fiber membrane precursor.

JJ. The method of Embodiment II, wherein annealing the asymmetric hollow fiber membrane precursor includes annealing the asymmetric hollow fiber membrane precursor prior to stretching the asymmetric hollow fiber membrane precursor.

KK. The method of any preceding Embodiment beginning with Embodiment FF, wherein the skin layer resin is substantially free of any pore-forming material in an amount effective to cause pore formation.

LL. The method of any preceding Embodiment beginning with Embodiment FF, wherein co-extruding the substrate resin and the skin layer resin to form an asymmetric hollow fiber membrane precursor includes co-extruding the substrate resin and the skin layer resin through an annular co-extrusion die to form the asymmetric hollow fiber membrane precursor.

MM. The method of any preceding Embodiment beginning with Embodiment FF, wherein the plurality of pores comprises micropores.

NN. The method of Embodiment MM, wherein the plurality of micropores has a diameter of from 0.01 micrometer to 1.0 micrometer, optionally wherein the plurality of micropores has a diameter of from 0.02 micrometer to 0.5 micrometer.

OO. The method of any preceding Embodiment beginning with Embodiment FF, wherein the asymmetric hollow fiber membrane exhibits a porosity of from 5% to 80%, optionally wherein the asymmetric hollow fiber membrane exhibits a porosity of from 10% to 50%.

PP. The method of any preceding Embodiment beginning with Embodiment FF, wherein the skin layer is less porous than the porous substrate and comprises an outer surface of the asymmetric hollow fiber membrane, optionally wherein the porous substrate comprises an inner surface of the asymmetric hollow fiber membrane.

QQ. The method of any preceding Embodiment beginning with Embodiment FF, wherein the skin layer is nonporous.

RR. The method of any preceding Embodiment beginning with Embodiment FF, wherein the porous substrate further includes a nucleating agent in an amount effective to achieve nucleation, optionally wherein the skin layer is free of a nucleating agent in an amount effective to achieve nucleation.

SS. The method of any preceding Embodiment beginning with Embodiment FF, wherein the skin layer has a thickness of less than 20 micrometers, wherein the skin layer has a thickness of less than 5 micrometers.

TT. The method of any preceding Embodiment beginning with Embodiment FF, wherein the porous substrate has a thickness of from 5 micrometers to 200 micrometers.

UU. The method of Embodiment TT, wherein the porous substrate has a thickness of from 10 micrometers to 100 micrometers.

VV. The method of Embodiment UU, wherein the porous substrate has a thickness of from 20 micrometers to 50 micrometers.

WW. The method of Embodiment TT, wherein the porous substrate has a thickness of from 5 micrometers to 10 micrometers.

XX. The method of any preceding Embodiment beginning with Embodiment FF, wherein the asymmetric hollow fiber membrane is a non-homogeneous asymmetric hollow fiber membrane.

YY. The method of any preceding Embodiment beginning with Embodiment FF, wherein the skin layer completely covers the porous substrate.

ZZ. The method of any preceding Embodiment beginning with Embodiment FF, further including annealing the asymmetric hollow fiber membrane precursor.

AAA. The method of Embodiment ZZ, wherein annealing the asymmetric hollow fiber precursor includes annealing the asymmetric hollow fiber membrane precursor prior to stretching the asymmetric hollow fiber membrane precursor.

BBB. The method of any preceding Embodiment beginning with Embodiment FF, wherein the skin layer comprises an outer layer, an inner layer, both an outer layer and an inner layer, or an internal layer sandwiched between two other layers of the asymmetric hollow fiber membrane.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
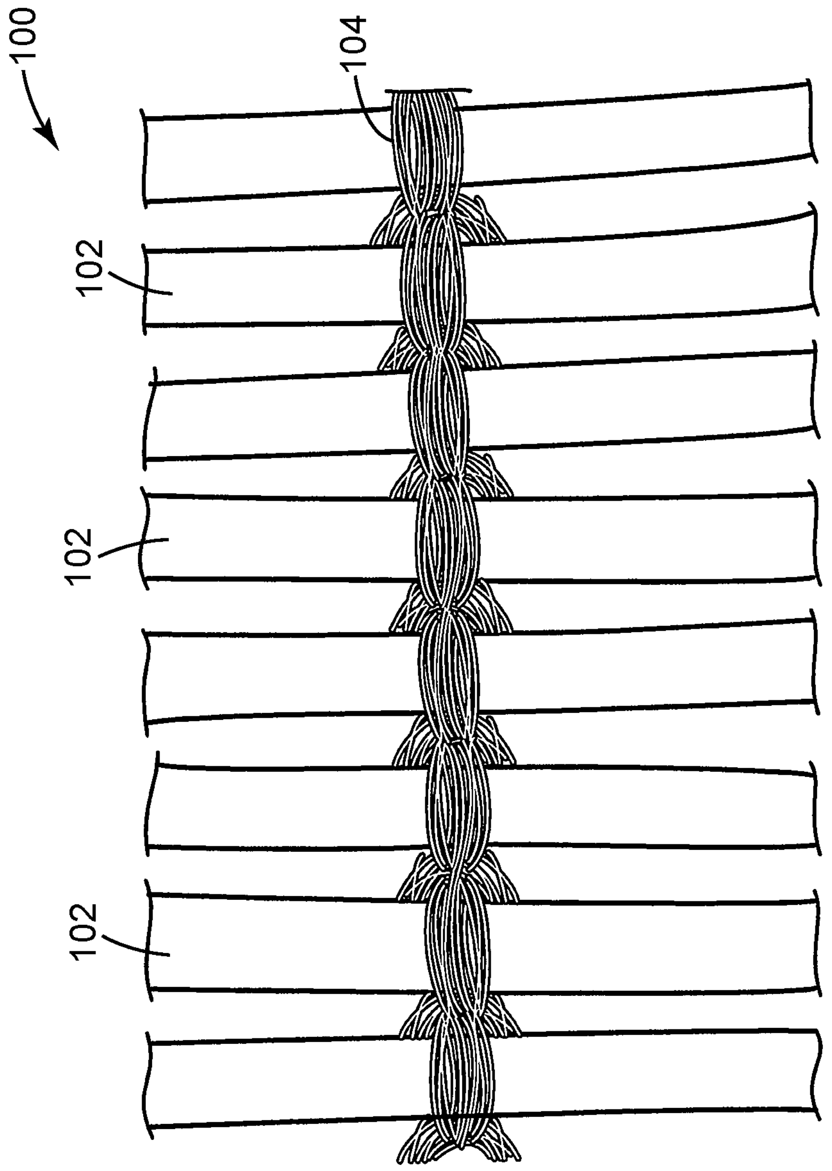
FIG. 1 is a magnified surface view of an exemplary hollow fiber membrane array useful in producing porous membrane contactors according to certain embodiments of the present disclosure.

In the drawings, like reference numerals indicate like elements. While the above-identified drawings, which may not be drawn to scale, set forth various embodiments of the present disclosure, other embodiments are also contemplated, as noted in the Detailed Description. This Detailed Description describes representative exemplary and presently-preferred embodiments. It should be understood that numerous other modifications and embodiments can be devised by those skilled in the art, which fall within the scope and spirit of this disclosure and the claims.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. Thus, it should understood that:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "semi-crystalline" with respect to a (co)polymer means that the (co)polymer exhibits a crystalline melting temperature as determined using differential scanning calorimetry and is intended to refer to both partially crystalline and fully crystalline (co)polymers.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula $—R^a—Ar$ where $R^a$ is an alkylene and Ar is an aryl group. That is, the aralkyl is an alkyl substituted with an aryl.

The term "aralkylene" refers to a divalent group of formula $—R^a—Ar^a—$ where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term “halo” refers to fluoro, chloro, bromo, or iodo.

The term “haloalkyl” refers to an alkyl having at least one hydrogen atom replaced with a halo. Some haloalkyl groups are fluoroalkyl groups, chloroalkyl groups, or bromoalkyl groups.

The term “heteroalkylene” refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term “oxalyl” refers to a divalent group of formula —(CO)—(CO)— where each (CO) denotes a carbonyl group.

The terms “oxalylamino” and “aminoxalyl” are used interchangeably to refer to a divalent group of formula —(CO)—(CO)—NH— where each (CO) denotes a carbonyl.

The term “aminoxalylamino” refers to a divalent group of formula —NH—(CO)—(CO)—$NR^d$— where each (CO) denotes a carbonyl group and $R^d$ is hydrogen, alkyl, or part of a heterocyclic group along with the nitrogen to which they are both attached. In most embodiments, $R^d$ is hydrogen or alkyl. In many embodiments, $R^d$ is hydrogen.

The terms “polymer” and “polymeric material” refer to both materials prepared from one monomer such as a homopolymer or to materials prepared from two or more monomers such as a copolymer, terpolymer, or the like. Likewise, the term “polymerize” refers to the process of making a polymeric material that can be a homopolymer, copolymer, terpolymer, or the like. The terms “copolymer” and “copolymeric material” refer to a polymeric material prepared from at least two monomers.

The term “polydiorganosiloxane” refers to a divalent block or segment of formula:

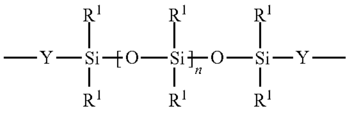

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The term “hollow fiber membrane” means an artificial semi-permeable barrier in the form of an open tubular filament of indeterminant length.

The term “asymmetric” with respect to a hollow fiber membrane means that the membrane has two major surfaces, an internal lumen surface and an external sheath surface, that are compositionally and/or structurally and/or functionally different.

The term “homogeneous” means exhibiting only a single phase of matter when observed at a macroscopic scale.

The term “microporous” with respect to a hollow fiber membrane means that the membrane is formed of a solid matrix with defined, generally circular openings or holes (pores) formed therein, wherein the pores generally have a diameter of at least 10 nm, and less than 1 mm.

The term “nonporous” means a dense film through which the permeants are transported by diffusion under the driving force of a concentration, pressure, or electrical potential gradient.

The term “nucleating agent” means a substance which promotes the crystallization (nucleation) of semi-crystalline polymers in melt processing.

The term “annealing” with respect to a crystalline or semi-crystalline (co)polymer means heating the (co)polymeric material at a specified temperature for a period of time sufficient to alter crystal microstructure and reduce crystal imperfections. The annealing temperature is typically lower than the melting point of the (co)polymer; and the duration is long enough to achieve thermal refinement of the crystal structure.

The term “adjoining” with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as “atop”, “on”, “over,” “covering”, “uppermost”, “overlaying,” “underlying” and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term “overcoated” to describe the position of a layer with respect to a substrate or other element of an article of the present disclosure, we refer to the layer as being atop the substrate or other element, but not necessarily contiguous to either the substrate or the other element.

By using the term “separated by” to describe the position of a layer with respect to other layers, we refer to the layer as being positioned between two other layers but not necessarily contiguous to or adjacent to either layer.

The terms “about” or “approximately” with reference to a numerical value or a shape means +/−five percent of the numerical value or property or characteristic, but expressly includes the exact numerical value. For example, a viscosity of “about” 1 Pa-sec refers to a viscosity from 0.95 to 1.05 Pa-sec, but also expressly includes a viscosity of exactly 1 Pa-sec. Similarly, a perimeter that is “substantially square” is intended to describe a geometric shape having four lateral edges in which each lateral edge has a length which is from 95% to 105% of the length of any other lateral edge, but which also includes a geometric shape in which each lateral edge has exactly the same length.

The term “substantially” with reference to a property or characteristic means that the property or characteristic is exhibited to a greater extent than the opposite of that property or characteristic is exhibited. For example, a substrate that is “substantially” transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The terms “room temperature” and “ambient temperature” are used interchangeably to mean temperatures in the range of 20° C. to 25° C.

As used in this specification and the appended embodiments, the singular forms “a”, “an”, and “the” include plural referents unless the content clearly dictates otherwise. Thus, for example, reference to fine fibers containing “a compound” includes a mixture of two or more compounds. As used in this specification and the appended embodiments, the term “or” is generally employed in its sense including “and/or” unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term “about.” Accordingly, unless indicated to the contrary, the numerical parameters set forth in the foregoing specification and attached listing of embodiments can vary depending upon the desired properties sought to be obtained by those skilled in the art using the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments but are to be controlled by the limitations set forth in the claims and any equivalents thereof.

skin layer comprises an outer sheath surface of the asymmetric hollow fiber membrane. In certain presently-preferred embodiments, the skin layer is nonporous.

In some exemplary embodiments, the skin layer has a thickness of less than 20 micrometers or even less than 5 micrometers. In certain such exemplary embodiments, the porous substrate has a thickness of from 5 micrometers to 200 micrometers, from 10 micrometers to 100 micrometers, from 20 micrometers to 50 micrometers, or even from 5 micrometers to 10 micrometers.

In further exemplary embodiments, the asymmetric hollow fiber membrane is a non-homogeneous asymmetric hollow fiber membrane. In certain such embodiments, the skin layer is non-porous or exhibits small diameter pores and the porous substrate exhibits larger diameter pores. In some such embodiments, the membrane morphology is isotropic in the radial direction.

In certain exemplary embodiments, the asymmetric microporous hollow fiber membrane exhibits the following characteristics: $CO_2$ gas permeation rate of 784 GPU (1 GPU=$10^{-6}$ scc/cm$^2$-sec-cm Hg; $CO_2/N_2$ selectivity of between 10 and 12 (e.g., 11.2), skin layer thickness of 2.6 μm; fiber outer diameter (OD) of about 280 μm; fiber wall thickness of 29 μm; and total coverage (i.e., 100%) of the skin layer over the porous substrate.

Materials for Producing Asymmetric Hollow Fiber Membranes

The present disclosure describes an asymmetric hollow fiber membrane including a porous substrate having a multiplicity of pores, and a skin layer overlaying the porous substrate. The porous substrate comprises at least one semicrystalline thermoplastic polyolefin (co)polymer resin; and the skin layer comprises at least one polydiorganosiloxane polyoxamide copolymer resin comprising at least two repeat units of Formula I:

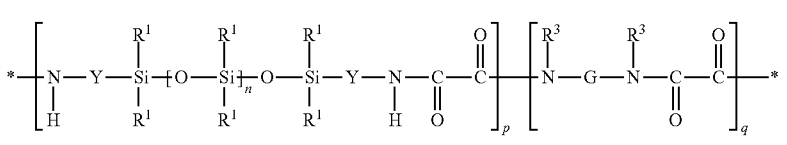
I

Asymmetric Hollow Fiber Membranes

Figure 2:
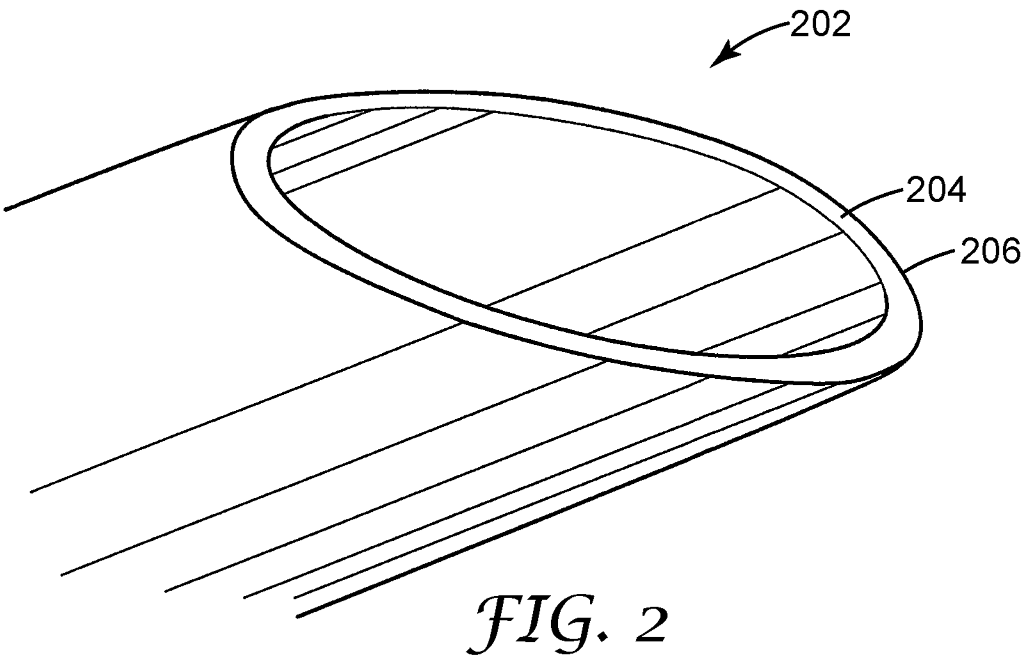
FIG. 2 is a magnified perspective view of an end of an exemplary hollow fiber membrane according to certain embodiments of the present disclosure.

Referring now to FIG. 2, in one embodiment, the present disclosure describes an asymmetric hollow fiber membrane 202 including a porous substrate 204 having a plurality of pores, and a skin layer 206 overlaying the porous substrate 204.

Figure 3:
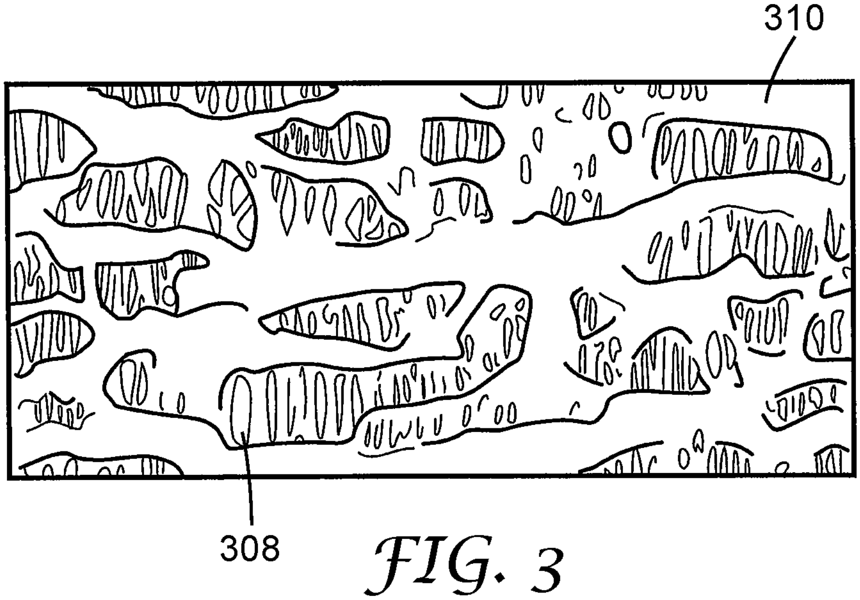
FIG. 3 is a magnified surface view of a portion of the porous substrate layer forming the interior of a hollow fiber according to certain embodiments of the present disclosure.

As shown in FIG. 3, the surface 310 of the porous substrate has a plurality of pores 308. In certain presently-preferred embodiments, the plurality of pores includes micropores. In some such embodiments, the micropores have a diameter of from 0.01 micrometer to 1.0 micrometer. In other embodiments, the micropores have a diameter of from 0.02 micrometer to 0.5 micrometer. In further exemplary embodiments, the asymmetric hollow fiber membrane exhibits a porosity of from 5% to 80%. In other embodiments, the asymmetric hollow fiber membrane exhibits a porosity of from 10% to 50%.

In certain presently-preferred embodiments, the skin layer completely covers the porous substrate. In some exemplary embodiments, the skin layer is less porous than the porous substrate and comprises an outer surface of the asymmetric hollow fiber membrane. In some such embodiments, the porous substrate comprises an inner lumen surface, and the wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN\text{-}G\text{-}NHR^3$ minus the two —$NHR^3$ groups;

$R^3$ is hydrogen or alkyl or $R^3$ taken together with G and to the nitrogen to which they are both attached form a heterocyclic group;

n is independently an integer of 0 to 1500; and p is an integer of 1 to 10 q is an integer of 1 or greater.

Preferably, n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer. In such embodiments, n, p and q are selected so that the polydiorganosiloxane block comprises no more than 99.9 wt %, 99.8 wt %, 99.7 wt % or even 99.5 wt % of the polydiorganosiloxane polyoxamide copolymer.

Porous Substrate Resins

The porous substrate 204 is comprised of at least one semi-crystalline thermoplastic polyolefin copolymer, which may be linear or branched.

The linear or branched semi-crystalline thermoplastic alpha olefin monomers may be selected from the group consisting of ethylene, propylene, 1-butene, 1-pentene, 2-methyl-1-pentene, 3-methyl-1-pentene, 4-methyl-1-pentene, 1-hexene, 1-heptene, isobutylene, vinylcyclohexane, 3-ethyl-1-pentene, 1,3-methyl-1-pentene, cyclobutene, cyclopentane, 2-norbornene, 3-methyl-2-norbornene, 5-methyl-2-norbornene, tetracyclododecene, methyltetracyclododecene, dimethyltetracyclododecenel-octene, 1-nonene, 1-decene, 1-undecene, 1-dodecene, 1-tridecene, 1-tetradecene 1-pentadecene, 1-hexadecene, 1-heptadecene, 1-octadecene, 1-eicosene, or a combination thereof.

In certain presently preferred embodiments, the semi-crystalline thermoplastic polyolefin (co)polymer advantageously comprises polyethylene, polypropylene, or a combination thereof.

Suitable crystalline thermoplastic polypropylene homopolymer porous substrate resins are available from Total Petrochemicals (Houston, TX) under the trade designation FINA such as, for example FINA 3271, FINA 3276, FINA 3281, FINA 3371, FINA 3462, FINA 3480Z, or under other trade designations such as PPR 3260. Other suitable polypropylene homopolymers are available from Lyondel-Basell Industries (Pasadena, TX) under the trade designation PRO-FAX such as, for example, PRO-FAX 1280 PRO-FAX 814, PRO-FAX 1282, PROFAX 1283 or under other trade designation such as ADFLUEX X500F, ADSYL 3C30F, HP403G, TOPPYL SP 2103. Additional suitable polypropylene homopolymers are available from INEOS Olefins & Polymers, USA (Carson, CA), for example INEOS H01-00, INEOS HO2C-00, INEOS HO4G-00, and INEOS H12G-00. Further suitable polypropylene homopolymers are available from Exxon-Mobil Chemical Co. (Spring, TX), for example, PP1024E4, PP2252E3, PP4292E1, and PP4612E2.

Suitable crystalline thermoplastic polyethylene (PE) homopolymer porous substrate resins are available from Exxon-Mobil Chemical Co. Spring, TX), for example, HDPE 6908. Suitable polyethylene homopolymers are also available from Total Petrochemicals (Houston, TX), for example, HDPE 9458, HDPE9460, HL428, HL717, and Total 6480. Other suitable polyethylene homopolymers are available from Braskem Chemical and Plastics Company (LaPorte, TX), for example, HF0144, HF0150, HF0147, and FH35.

In some embodiments, the substrate resin can also include one or more poly(methyl)pentene (PMP) copolymer resin. Suitable grades of PMP copolymer resin having a low content of linear or branched alpha olefin comonomers that are useful as a porous substrate resin are available from Mitsui Chemical (Minato-Ku, Tokyo, Japan) under the general trade designation TPX, for example resin grades DX470, RT18, DX820, and DX845.

Suitable crystalline thermoplastic polybutene-1 (PB-1) homopolymer porous substrate resins are available from Lyondel-Basell Industries (Pasadena, TX) under the trade designation Akoalit, for example Akoalit PB 4268

In further exemplary embodiments, the porous substrate may have a thickness in the range of 5-200 μm, of 10-100 μm, of 15-75 μm, of 20-50 μm, or of 25-35 μm. In some exemplary embodiments, the substrate may have an even lower thickness (for example, less than 25 μm, <20 μm, <15 μm, <10 μm or even about 5 μm), in various film and/or flat-sheet exemplary embodiments).

Skin Layer Resins

The skin layer 206 is comprised of a polydiorganosiloxane polyoxamide ("PDSP") copolymer comprising at least two repeat units of the following Formula I:

I

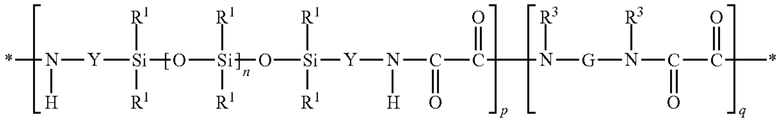

In this formula, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500, the subscript p is an integer of 1 to 10, and the subscript q is an integer of 1 or greater.

Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula I.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen.

Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms.

In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula I, at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Preferably, n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer. In such embodiments, n, p and q are selected so that the polydiorganosiloxane block comprises no more than 99.9 wt %, 99.8 wt %, 99.7 wt % or even 99.5 wt % of the polydiorganosiloxane polyoxamide copolymer.

Group G in Formula I is a residual unit that is equal to a diamine compound of formula $R^3HN\text{-}G\text{-}NHR^3$ minus the two amino groups (i.e., $—NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN\text{-}G\text{-}NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N\text{-}G\text{-}NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof.

Suitable polydiorganosiloxanes include the polydiorganosiloxane diamines which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula $—R^a—(CO)—NH—$ where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and can be an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

Optionally, non-reactive additives such as fillers, pigments, stabilizers, antioxidants, flame retardants, compatibilizers, and the like can be added to the copolymeric materials.

The polydiorganosilocane polyoxamides are soluble in many common organic solvents such as, for example, toluene, tetrahydrofuran, dichloromethane, aliphatic hydrocarbons (e.g., alkanes such as hexane), or mixtures thereof.

The polydiorganosiloxane polyoxamides can be cast from solvents as film, molded or embossed in various shapes, or extruded into films. The high temperature stability of the copolymeric material makes them well suited for extrusion methods of film formation.

In some exemplary embodiments, each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

In further exemplary embodiments, G is an alkylene, heteroalkylene, arylene, aralkylene, polydiorganosiloxane, or a combination thereof. In other exemplary embodiments, wherein $R^3$ is advantageously selected to be H or methyl.

In some presently preferred embodiments, at least 50 percent, at least 60 percent, at least 70 percent, at least 80 percent, at least 90 percent, or even 100% of the $R^1$ groups are methyl.

In additional presently preferred embodiments, n is at least 40, at least 50, at least 75, at least 100, at least 250, at least 500, at least 750, at least 1,000, or even up to 1500. In some such exemplary embodiments, n may be no more than 1400, no more than 1300, no more than 1200, no more than 1100, no more than 1000, no more than 750, no more than 500, no more than 250, or even no more than 100.

Suitable polydiorganosiloxane polyoxamide copolymers (PDSP) and methods of making such PDSP copolymers are disclosed in U.S. Pat. No. 7,501,184, the entire disclosure of which is incorporated herein by reference in its entirety.

In various implementations that include multi-layered microporous membranes, the skin layer may be positioned as any layer of a multi-layered asymmetric hollow fiber; for example, the PDSP skin may make up one or more outer and/or inner layers of a multi-layered asymmetric hollow fiber comprising multiple layers, for example, three or more layers.

In various exemplary embodiments, the PDSP skin may be an outer exposed surface of a hollow fiber, or an internal lumen surface of a hollow fiber, or an internal layer sandwiched between two other layers in a multilayer hollow fiber membrane.

Additionally, for a hollow fiber asymmetric hollow fiber, the PDSP skin may be advantageously positioned on the shell side or the lumen side of such a hollow fiber asymmetric hollow fiber.

Furthermore, the temperature stability of the membranes described herein may be improved relative to other known membranes, as the softening point of the PDSP copolymer may add temperature stability to the asymmetric hollow fiber.

The PDSP copolymer could undergo further post treatment to increase the chemical resistance and mechanical strength of the membrane. For example, the PDSP copolymer may be treated with actinic radiation, for example with ultraviolet, visible or infrared radiation, or with ionizing radiation, for example with electron beam radiation or gamma radiation, in order to react and/or chemically crosslink the copolymer, optionally with one or more radiation curable materials.

Further, an asymmetric hollow fiber formed from a PDSP skin layer and a PE or PP microporous substrate layer may provide the benefit of having higher gas permeability than other membranes because of the high porosity of the microporous substrate. In various implementations described herein, a microporous substrate may be used that has a porosity of more than 20%, or more than 25%, or more than 35%, or more than 40%.

Figure 4A:
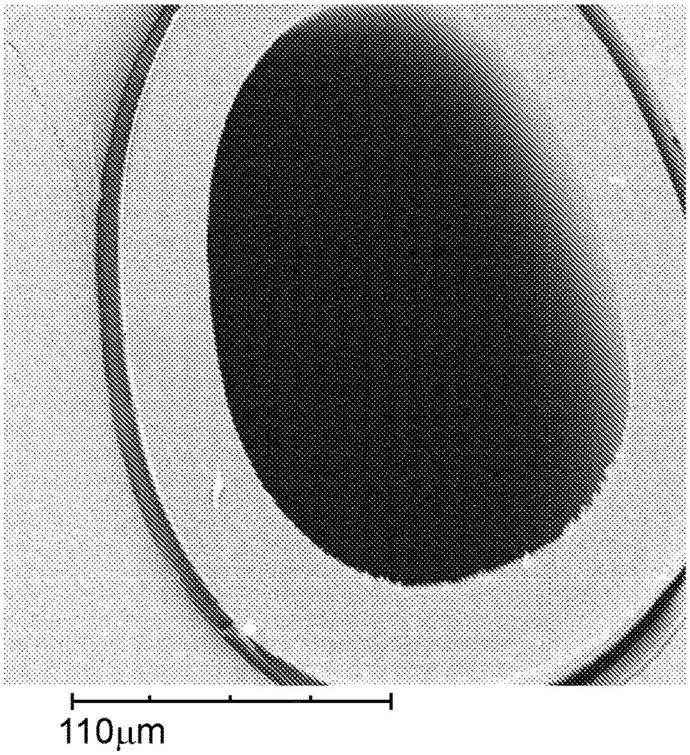
FIG. 4A is a micrograph obtained using optical microscopy of an end view of an exemplary hollow fiber membrane according to certain embodiments of the present disclosure.
Figure 4B:
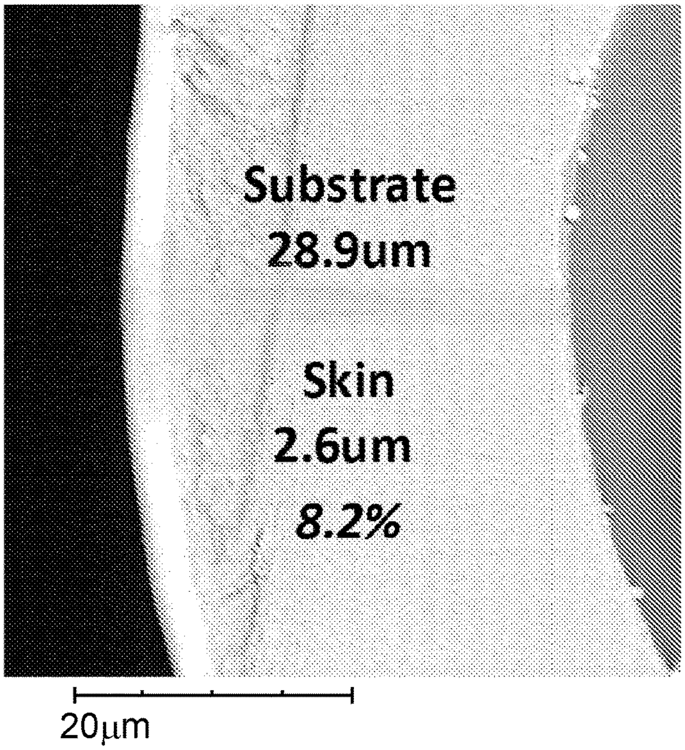
FIG. 4B is a micrograph obtained using optical microscopy of a cross-sectional end view of the wall of an exemplary hollow fiber membrane according to certain embodiments of the present disclosure.

The PDSP copolymer skin is advantageously selected to provide a nonporous skin, such as a solid skin without pores (or a skin without permeability to liquids but with permeability to gases) that is positioned on a microporous substrate. An image of example nonporous skins are provided in FIGS. 4A and 4B. FIG. 4A provides a first image of an example nonporous PDSP copolymer skin on a porous substrate. FIG. 4B provides a second image of an example nonporous PDSP copolymer skin on a porous. As can be seen, the PDSP skin is substantially free from defects.

The characteristics of the PDSP skin layer can be attributed in part to the dry-stretch process (or CELGARD® process) by which the instant microporous membranes are produced. An exemplary dry stretch process includes the steps of providing a polydiorganosiloxane polyoxamide ("PDSP") copolymer and a substrate resin; co-extruding the PDSP copolymer and the substrate resin to form an asymmetric hollow fiber membrane precursor; and stretching the asymmetric hollow fiber membrane precursor to form an asymmetric hollow fiber having a PDSP skin on a porous substrate.

No solvents or phase inversion are used in the dry stretch process to form the asymmetric hollow fiber. Likewise, no porosity is induced in the PDSP skin layer in the various implementations of the CELGARD® process described herein.

The thickness of the PDSP skin can depend on the particular application in which the microporous asymmetric hollow fiber is employed. In exemplary implementations, the PDSP skin may be 20 micrometers (μm) or less in thickness, 15 μm or less, 10 μm or less, 9 μm or less, 8 μm or less, 7 μm or lessor, 6 μm or less, 5 μm or less, 3 μm or less, or even approximately 2 μm thick. In various implementations, decreasing the thickness of the PDSP skin results in a more efficient asymmetric microporous asymmetric hollow fiber membrane.

In some embodiments, the PDSP skin may have a thickness in the range of 1-50 μm, 2-40 μm, 3-30 μm, 4-20 μm, 5-15 μm, or even 5-10 μm. In some implementations, the substrate may have an even lower thickness (for example, less than 5 μm, 4 μm, 3 μm, 2 μm, or even 1 μm), in various film and/or flat-sheet implementations).

In certain exemplary embodiment, some of skin layer PDSP material may penetrate into the substrate layer and physically intertwine with the at least one semi-crystalline thermoplastic polyolefin copolymer.

Optional Nucleating Agent

In certain exemplary embodiments, the porous substrate resin may advantageously further include a nucleating agent in an amount effective to achieve nucleation. Suitable nucleating agents are known to those skilled in the art and include alpha- and beta-nucleating agents.

Alpha-nucleating agents can either be melting nucleating agents or insoluble nucleating agents. A melting nucleating agent is a nucleating agent that melts during the blending of the melt blend but recrystallizes before the polymer separates from the mixture and crystallizes. Exemplary melting nucleating agents include, but are not limited to, an alkanoic acid compounds, benzoic acid compounds, dicarboxylic acid compounds, and sorbitol acetal compounds.

Exemplary melting nucleating agents include, but are not limited to, dibenzylidene sorbitol, adipic acid, benzoic acid and sorbitol acetal compounds. Exemplary commercially-available melting nucleating agents include, but are not limited to, MILLAD® 3988 and MILLAID® NX8000 available from Milliken Chemical (Spartanburg, SC); or NA-806A available from Amfine Chemical Corporation (Hasbrouck Heights, NJ).

An insoluble alpha nucleating agent is a nucleating agent that does not melt during the blending of the melt blend. Generally, a material can be useful as an insoluble nucleating agent if it can be uniformly dispersed in the melt blend as discrete particles capable of acting as a heterogeneous nucleation site for the polymer component.

Exemplary insoluble nucleating agents include, but are not limited to, inorganic particulate materials and pigments. Exemplary inorganic particulate materials include, but are not limited to, bicyclo[2.2.1]heptane-2,3-dicarboxylic acid, disodium salt (commercially available from Milliken & Company (Spartanburg, SC) under the trade designation HYPERFORM® HPN-20E), $TiO_2$, talc, fine metal particles or fine particles of a polymeric material such as polytetrafluoroethylene.

Exemplary pigments include, but are not limited to, copper phthalocyanine blue or green pigment and D&C Red 6 (Disodium Salt), for example. The particular nucleating agent that is used can be selected based on one or more criterion such as the polyolefin (co)polymer used in the porous substrate, the desired pore size in the particular zone of the porous membrane, and the like.

Alpha nucleating agents aid the formation the alpha crystals (monoclinic crystal configuration) only. There are also useful beta nucleating agents which are effective to generate beta crystals (hexagonal unit cell crystal configuration). Exemplary beta nucleating agents include, but are not limited to, quinacridone dye, aluminum salt of 6-quinizarin sulfonic acid, disodium salt o-phthalic acid, isophthalic and terephthalic acids, and N,N'-dicyclohexyl-2,6-naphthalene dicarboximide compounds. Exemplary commercially-available beta nucleating agent include, but are not limited to, MPM 2000 commercially available from Mayzo, Inc. (Suwanee, GA).

Suitable nucleating agents for polyethylene (PE) porous substrate resins include, but are not limited to, inorganic nano-sized (i.e., having a particle dimension or diameter of less than one micrometer) fillers like calcium carbonate, titanium dioxide, barium sulfate, silicon dioxide, graphite, carbon nanotubes, Montmorillonite clay, talc, halloysite; or organic fillers like ultra-high molecular weight PE, polymer fibers, anthracene, potassium hydrogen phthalate, benzoic acid type compounds, sodium benzoate type compounds, and zinc monoglycerolate. Other suitable melting nucleating agents are listed in *Polymer Engineering & Science*, Vol. 5, (2016), page 541.

In some exemplary embodiments, a melting nucleating agent can be used alone. In other exemplary embodiments, an insoluble nucleating agent can be used alone. In some particular embodiments, a melting nucleating agent can be used advantageously nu combination with an insoluble nucleating agent.

The nucleating agent(s) are used in the melt blend in an amount sufficient to initiate crystallization of the polymer at nucleation sites during fiber forming. The amount of nucleating agent required depends, at least in part, on one or more of the particular (co)polymer used, the desired porosity and pore size, the particular nucleating agent used, and the like. In some exemplary embodiments, the melt blend can advantageously include no more than 5 wt. % of the nucleating agent based on the total weight of the melt blend. In other exemplary embodiments, the melt blend can include from about 100 parts per million (ppm) to less than 5 wt. % of the nucleating agent based on the total weight of the melt blend. In further exemplary embodiments, the melt blend can include no more than 2 wt. % of the nucleating agent based on the total weight of the melt blend. In other exemplary embodiments, the melt blend can include from about 200 ppm to less than 2 wt. % of the nucleating agent based on the total weight of the melt blend.

Methods of Making Asymmetric Hollow Fiber Membranes

In a further embodiment, the disclosure describes a method of making an asymmetric hollow fiber membrane including providing at least one substrate resin and at least one skin layer resin, co-extruding the substrate resin and the skin layer resin to form an asymmetric hollow fiber membrane precursor, and stretching the asymmetric hollow fiber membrane precursor to form an asymmetric hollow fiber membrane having a skin layer made of the skin layer resin overlaying a porous substrate made of the substrate resin and having a multiplicity of pores.

The substrate resin comprises at least one semi-crystalline thermoplastic polyolefin (co)polymer; and the skin layer comprises a polydiorganosiloxane polyoxamide copolymer comprising at least two repeat units of Formula I:

I

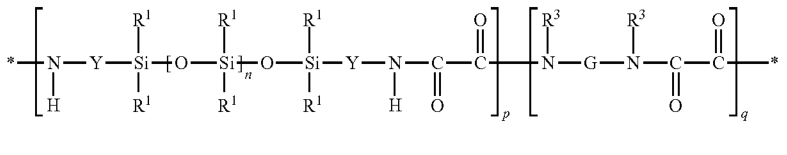

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN\text{-}G\text{-}NHR^3$ minus the two $—NHR^3$ groups;

$R^3$ is hydrogen or alkyl or $R^3$ taken together with G and to the nitrogen to which they are both attached form a heterocyclic group;

n is independently an integer of 0 to 1500; and p is an integer of 1 to 10 q is an integer of 1 or greater.

Preferably, n, p and q are selected so that the polydiorganosiloxane block comprises at least 50 weight percent (wt %), at least 60 wt %, at least 80 wt %, at least 85 wt %, at least 90 wt %, or even at least 95 wt % of the polydiorganosiloxane polyoxamide copolymer. In such embodiments, n, p and q are selected so that the polydiorganosiloxane block comprises no more than 99.9 wt %, 99.8 wt %, 99.7 wt % or even 99.5 wt % of the polydiorganosiloxane polyoxamide copolymer.

The semi-crystalline thermoplastic polyolefin (co)polymer is derived by polymerizing one or more branched or linear alpha olefin monomers selected from the group consisting of ethylene, propylene, 1-butene, 1-pentene, 2-methyl-1-pentene, 3-methyl-1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, or a combination thereof.

The semi-crystalline thermoplastic polyolefin (co)polymer preferably comprises polyethylene, polypropylene, or a combination thereof, more preferably, the polyolefin (co) polymer consists of or consists essentially of polypropylene.

In some exemplary embodiments, the skin layer resin is substantially free of any pore-forming material in an amount effective to cause pore formation. In some such embodiments, co-extruding the substrate resin and the skin layer resin to form an asymmetric hollow fiber membrane precursor includes co-extruding the substrate resin and the skin layer resin through an annular co-extrusion die to form the asymmetric hollow fiber membrane precursor.

In certain exemplary embodiments, the method further includes annealing the asymmetric hollow fiber membrane precursor prior to stretching the asymmetric hollow fiber membrane precursor. Annealing is preferably conducted by exposing the asymmetric hollow fiber membrane precursor to a heat source such as an oven or infrared heat lamp, and the like, for a specified time period. Annealing can be conducted either under relaxed conditions with minimal tension imposed on the asymmetric hollow fiber membrane precursor, or under tensioned conditions. Annealing may be carried out in a continuous, semi-continuous or batch process.

The microporous membranes described herein can be fabricated from various production methods depending on the desired asymmetric hollow fiber structure and the desired asymmetric hollow fiber composition. Microporous membranes can be fabricated according to various production techniques, such as the wet process, the dry-stretch process (also known as the CELGARD process), and the particle stretch process.

Generally, in the wet process, (also known as the phase inversion process, the extraction process, or the TIPS process), a polymeric raw material is mixed with an oil, a processing oil, a solvent, and/or another material, this mixture is extruded, and pores are then formed when such an oil, processing oil, solvent, and/or other material is removed. These films may be stretched before or after the removal of the oil, solvent, and/or other material.

Generally, the microporous membranes are preferably formed via the CELGARD® process, also referred to as the "extrude, anneal, stretch" or "dry stretch" process, whereby a semi-crystalline polymer is extruded to provide a asymmetric hollow fiber membrane precursor and a porosity is induced in the microporous substrate by stretching the extruded precursor.

Generally, in the particle stretch process, the polymeric raw material is mixed with particulate, this mixture is extruded, and pores are formed during stretching when the interface between the polymer and the particulate fractures due to the stretching forces. The dry process differs from the wet process and the particle stretch process by producing a porous asymmetric hollow fiber typically without addition of a processing oil, oil, solvent, plasticizer, and/or the like, or particulate material. Generally, the dry-stretch process refers to a process where pore formation results from stretching a nonporous precursor.

While membranes made by the dry-stretch process have met with excellent commercial success, there is a need to improve their physical attributes, so that they may be used in a wider spectrum of applications. Accordingly, an asymmetric hollow fiber is described that includes a PDSP copolymer skin positioned on a porous polyolefin substrate to provide functionality that may be suitable, for example, as battery separators (useful in consumer electronics applications and electric vehicle or hybrid electric vehicle applications), in blood oxygenation applications, blood filtering applications, various applications where a liquid needs to be degassed, as well as ink jet printing applications for debubbling or degassing ink, and may be well suited for use in hollow fiber asymmetric hollow fiber contactors or modules.

The method may also advantageously include a step of annealing the asymmetric hollow fiber membrane precursor prior to the stretching step. In an example implementation, the annealing step may include heating the asymmetric hollow fiber membrane precursor at a temperature of about 150° C. for about 10 minutes.

The step of co-extruding the PDSP copolymer skin layer resin and the polyolefin substrate resin to form an asymmetric hollow fiber membrane precursor can include extruding the skin resin and the substrate resin through a co-extrusion die to form a PDSP skin layer on a porous polyolefin substrate layer. The co-extrusion die can be configured based on the desired thicknesses of the PDSP skin layer and the polyolefin substrate layer. Thus, in exemplary embodiments, the substrate layer is thicker than the PDSP skin layer.

Another exemplary method of making an asymmetric hollow fiber having a PDSP skin and a porous polyolefin substrate as described herein, can include the steps of: providing a skin layer resin and a substrate resin; co-extruding the skin layer resin and the substrate resin to form an asymmetric hollow fiber membrane precursor; and stretching the asymmetric hollow fiber membrane precursor to form an asymmetric microporous asymmetric hollow fiber having a skin layer on a porous substrate. The method can also include a step of annealing the asymmetric hollow fiber membrane precursor prior to the stretching step.

An additional exemplary method of making an asymmetric hollow fiber having a PDSP copolymer skin and a porous polyolefin substrate as described above, can include the steps of: providing a PDSP copolymer resin and a substrate resin; co-extruding the PDSP copolymer resin and the substrate polyolefin resin to form an asymmetric hollow fiber membrane precursor; stretching the asymmetric hollow fiber membrane precursor to form an asymmetric hollow fiber comprising the PDSP skin on the porous polyolefin substrate. The substrate resin can include one or more polyolefins, for example polyethylene (PE), polypropylene (PP), or combinations thereof. The method can also include a step of annealing the hollow fiber asymmetric hollow fiber membrane precursor prior to the stretching step.

Preferably, the annealing temperature is selected below the melting point (temperature) of the substrate polymer, for example, PP substrate is preferably annealed at a temperature of from 100° C. to 150° C. The annealing time could be from seconds to hours; preferably 1-30 min; more preferably 5-20 min. Higher annealing temperatures generally permit use of lower annealing times.

Stretching can be advantageously performed using single or multi-stage cold stretching, optionally followed by single or multi-stage hot stretching. Preferably, the cold stretching temperature is selected to be between 5° C. and 70° C., more preferably between 10-50° C., above the glass transition temperature ($T_g$) of the substrate polymer. For example, a PP substrate is preferably stretched at 20-30° C. (PP glass transition temperature is −10° C.). Preferably, the hot stretching temp is selected to be between 10° C. and 120° C.

below melt temperature of substrate polymer, more preferably between 20-60° C., for example PP substrate is preferably stretched at 100-140° C.

The hollow fiber may be advantageously stretched to form an open porous structure by uniaxial extension of at least 5%, and up to 500%, more preferably at least 10% and up to 300%.

The hollow fibers after stretching may advantageously be exposed to a step of heat-setting to reduce the stress inside the fibers. The heat-setting temperature is typically selected to be higher than the hot stretching temperature by at least 5° C., at least 10° C., or even at least 15° C. The heating setting duration is typically selected to be at least 30 seconds, at least one minute.

Alternatively, the hollow fibers after stretching may advantageously be exposed to a relaxation step by allowing fiber lengths to shrink to a certain extent, which is at least 2%, or even at least 5%. Heating setting and relaxation can be used alone or combination.

Hollow Fiber Membrane Contactors

Referring once again to the drawings, FIG. 1 shows an exemplary hollow fiber membrane contactor component 100 in which a plurality of asymmetric hollow fiber membranes 102 is arranged substantially parallel in an array pattern and fastened together, in this case, by knitting or tying together the individual hollow fiber membranes 102 using string, thread, yarn, or the like 104. Thus, in further exemplary embodiments, the present disclosure describes a separation article comprising a multiplicity of the asymmetric hollow fiber membranes according to any of the foregoing embodiments.

In some exemplary embodiments, the multiplicity of asymmetric hollow fiber membranes is arranged in an array. In certain such embodiments, the array is pleated, folded, or rolled into a cylinder or a cassette.

In some exemplary embodiments, the separation article is selectively permeable to $CO_2$ over $N_2$ or $CH_4$. Preferably, the separation article exhibits a $CO_2/N_2$ selectivity of at least 8, 9, 10, 11 or even 12. In other exemplary embodiments, the filtration article is selectively permeable to $O_2$ over $N_2$.

In a further aspect, the disclosure describes a method of using any of the foregoing separation articles, wherein the separation article is used to separate a gas phase from a liquid phase. In some embodiments, the gas phase includes $N_2$, $O_2$, $CO_2$, $CH_4$, or a combination thereof.

In certain embodiments, the gas phase includes water vapor. In some such embodiments, the separation article is selectively permeable to water vapor over air. In certain such embodiments, the separation article may be useful in humidification or dehumidification of the gas phase.

In certain embodiments, the gas phase includes one or more volatile organic compounds. In such embodiments, the separation article may be useful in removing the volatile organic compounds from the gas phase.

In some embodiments, the liquid phase includes liquid water. Optionally, the liquid phase is an aqueous printing ink, or an aqueous brine. In some embodiments, the liquid phase includes one or more organic compounds. For example, the liquid phase may contain one or more organic alcohol, ketone, ether, ester, or hydrocarbon solvent. In some such embodiments, the liquid phase may include one or more surfactants. For example, the liquid phase may include one or more nonionic, anionic, cationic, or amphoteric surfactants.

A hollow fiber membrane contactor typically includes a cylindrical bundle or mat of asymmetric hollow fibers, and a rigid cylindrical shell or housing enclosing the fiber bundle. The shell may be provided with multiple ports, for example, four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into first and second end cap portions of the shell.

The number of windings or layers of hollow fiber array or fabric determines the depth of the panel. The end result is a hollow fiber array with X height, Y width, and Z depth. The hollow fiber array may be potted directly into a square or rectangular frame, similar in shape to an HVAC air filter. In at least one embodiment, gas to be treated would pass through the contactor array on the shell side (outside of the hollow fibers) in a cross-flow pattern with liquid (hot, cold, humidifying, or absorbent liquid) passing through the lumen side (interior of the hollow fibers) of the contactor array.

In at least certain embodiments, the present disclosure is directed to methods of producing or manufacturing asymmetric hollow fiber membrane contactors. In at least one embodiment, the hollow fiber panel contactor is produced by a method including winding a hollow fiber membrane array around a paddle to form a square or rectangular format fiber bundle. The number of windings or layers determines the depth or thickness of the panel. The end result is a fiber array with X height, Y width, and Z depth. Then, the wound array is removed from the paddle and potted directly into a square or rectangular frame, similar in size and shape to a heating, ventilation and air conditioning (HVAC) air filter.

If needed, the ends of the hollow fibers are opened and the lumen side fluid head spaces are formed or added at each end. Such a panel contactor is adapted to have air pass through the array on the shell side (outside of hollow fibers) in a cross-flow pattern with liquid (hot, cold, humidifying, and/or absorbent liquid) passing through or vacuum applied to the lumen side (interior of the hollow fibers) of the contactor array.

In at least one other embodiment, the panel contactor is produced by a method including pleating or folding (for example, z folded, accordion folded, or pleated, and then optionally wound) a hollow fiber membrane array to form a square or rectangular format fiber bundle. The number of folds or layers may determine the depth of the panel. The end result is a fiber array with X height, Y width, and Z depth. Then, the folded or pleated array is potted into a square or rectangular frame, similar in shape to an HVAC air filter.

If needed, the ends of the hollow fibers are opened and the lumen side fluid head spaces are formed or added at each end. Such a panel contactor is adapted to have air pass through the array on the shell side (outside of hollow fibers) in a cross-flow pattern with liquid (hot, cold, humidifying, and/or absorbent liquid) passing through or vacuum applied to the lumen side (interior of the hollow fibers) of the contactor array.

In at least certain embodiments, the present disclosure is directed to methods of using or uses of flat panel hollow fiber array contactors. In at least one embodiment, the panel contactor is used by a method including passing air to be treated through the contactor array on the shell side (outside of the hollow fibers) in a cross flow pattern at the same time that liquid (hot, cold, humidifying, and/or absorbent liquid) is passing through the lumen side (interior of the hollow fibers) of the contactor array. As such, the contactor is a lumen-side liquid contactor.

In at least one other embodiment, the panel contactor is used by or in a method including passing liquid to be treated through the contactor array on the shell side (outside of the hollow fibers) in a cross-flow pattern at the same time that a second liquid or gas is passing through the lumen side (interior of the hollow fibers) of the contactor array. As such, the contactor is a shell-side liquid contactor.

Other uses of the disclosed panel contactor may include: $CO_2$ scrubbing, greenhouse gas scrubbing, $SO_x$ scrubbing, $NO_x$ scrubbing, HCl scrubbing, ammonia scrubbing, gas humidification, gas dehumidification, absorption of moisture and latent heat for energy recovery in HVAC systems, air emission controls of noxious odors, such as at cattle or hog farms), and/or gas temperature control by varying the humidity level (such as in evaporative cooling or in a swamp cooler).

Thus, in accordance with at least selected embodiments of the present disclosure, the present new or improved hollow fiber membrane contactors address the drawbacks of prior contactors, are effective for some applications, are especially adapted for certain conditions, may have immediate customer familiarity and acceptance, do not use metal or other corrosive materials, do not use PVC, are modular, are replaceable, have standard air filter sizes, accommodate high air flow rates, have low shell-side pressure drop, allow for commercial production, and the like.

In at least one embodiment, a self-contained hollow fiber membrane contactor, filter or cartridge may include at least a first hollow fiber array including a plurality of at least first hollow fiber membranes each having a first end and a second end both being open, at least one rectangular frame, shell, casing or housing, and potting at each end. The first and second membrane ends are open, for example, to allow liquid to pass there through. It may be preferred that the hollow fibers be polyolefin, the frame be ABS, the potting be made of epoxy, and that the ends of the potting be cut off to form the open first and second hollow fiber ends following potting.

In accordance with at least selected embodiments, a combination or system of flat panel contactors includes two or more hollow fiber membrane panel contactors connected in series or in parallel. According to at least embodiments, the combination or system of flat panel contactors includes two or more hollow fiber membrane panel contactors connected in series with the frames of adjacent contactors abutting and aligned with one another (an optional gasket can be placed between abutting frames and/or between the end frames and duct work to provide an air tight seal there between).

In accordance with at least selected possibly preferred embodiments, the present panel membrane contactors (or membrane cartridges) preferably use thousands of asymmetric microporous hollow fibers knitted including into an array that is, for example, wound around a paddle or similar form, pleated, folded, and/or combinations thereof. During preferred operation, the air to be treated flows over the shell side (outside) of the hollow fibers, while the liquid desiccant flows through or in the lumen side or lumen side (inside) of the hollow fibers. Because of its hydrophobic nature, the membrane acts as an inert support to allow direct contact between a gas and liquid phase without dispersion.

In accordance with certain embodiments of the invention, there are provided a novel contactor, contactor system, and method for treating one fluid with another fluid.

The typical applications include oxygen removal from boiler water, beverage carbonation, nitrogenation, and ink degassing. The system used for gassing/degassing is also known as membrane contactor. A gas-liquid interface is formed on the surface of microporous membrane due to fiber hydrophobicity and small pore size. Efficiency of a hollow fiber membrane contactor is largely determined by the membrane gas transfer rate, which depends on fiber permeability and available fiber surface area in the module.

A typical hollow fiber membrane contactor consists of hundreds to thousands of asymmetric hollow fibers with at least 40% porosity. Smaller fiber diameters can allow a higher fiber packing density and provide higher total membrane surface area compared to a flat sheet membrane.

Methods of Using Hollow Fiber Membrane Contactors

The disclosure also describes methods of using any of the foregoing separation articles, in which the separation article is used to separate a gas phase from a liquid phase. Thus, in further exemplary embodiments, the disclosure is directed to methods of using the asymmetric hollow fiber membrane contactors. Such asymmetric hollow fiber membrane contactors and/or use may address one or more of the above-described needs or drawbacks of conventional hollow fiber membranes.

In certain embodiments, the gas phase includes $N_2$, $O_2$, $CO_2$, $CH_4$, or a combination thereof. In some such embodiments, the liquid phase includes liquid water. In certain presently-preferred embodiments, the liquid phase is an aqueous printing ink, or an aqueous brine (e.g., an aqueous well-injection brine used in petroleum recovery).

In accordance with at least another embodiment of the invention, a contactor system includes a source of liquid, a source of air or gas, and at least one flat panel contactor including a plurality of asymmetric hollow fibers, and a rectangular frame, shell, housing, or vessel. The source of liquid is preferably in fluid communication with the sheaths of the hollow fibers. The air or gas preferably passes over or across the fibers and through the contactor.

An asymmetric hollow fiber membrane contactor may be used for many purposes, including but not limited to, removing entrained gases from liquids, de-gassing liquids, filtering liquids, and adding a gas to a liquid. More particularly, asymmetric hollow fiber membrane contactors may be used advantageously used in removing entrained gases from inks used in printing.

In gassing/degassing processes, a continuous liquid/gas interface is created on the surface of microporous fiber. In aqueous solutions, liquid does not breach the fiber due to hydrophobicity of polypropylene and small pore size (50~100 nm). Surface porosity enables fast gas transfer cross fiber surface. However, typical hollow fiber membrane contactors can only process aqueous solutions.

For organic solvents or aqueous mixtures of water in a high proportion (e.g., greater than 50 wt. %, at least 60 wt. %, 70 wt. %, 80 wt. %, or even 90 wt. %) of an organic solvent, wetting of the polyolefin pore wall is inevitable due to the low surface energies of organic solvents and polyolefins. Under such process conditions, the hollow fiber membrane contactor may fail because of liquid breaching.

One approach to degas organic solvents is the use of an asymmetric hollow fiber that includes a PDSP copolymer skin positioned on a porous polyolefin substrate. The thin non-porous skin layer prevents liquid breach-through while still maintaining substantial gas permeability.

Asymmetric hollow fiber membrane contactors according to the present disclosure may also provide a means of accomplishing gas/gas, gas/liquid, and liquid/liquid (which can encompass liquid/dissolved solid) separations, transfers or additions. Membrane contactors typically are used to bring two immiscible fluid phases, for example, a first liquid and a second liquid, or a gas and a liquid, into contact with one another to effect separation and/or transfer of one or more components from one fluid to the other.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. The following materials are used in the following comparative examples and examples:

- Polypropylene PPH3271, Total Petrochemicals USA, Inc. (Houston, TX);
- PMP-Polyolefin Copolymer Resin DX470, Mitsui Chemical (Minato-Ku, Tokyo, Japan);
- PMP-Polyolefin Copolymer Resin MX002, Mitsui Chemical (Minato-Ku, Tokyo, Japan);
- PDSP 15K, Polydiorganosiloxane Polyoxamide Copolymer (15 kDa weight average molecular weight for the organosiloxane block) prepared according to Example 16 of U.S. Pat. No. 7,501,184, the entire disclosure of which is incorporated herein by reference in its entirety. KAPTON Film tape, 3M Company (St Paul, MN);
- ¼" Nylon tube, Grainger, Inc. (Minooka, IL);
- DP100 Epoxy Adhesive, Scotch-Weld DP100 Plus Clear, 3M Company (St Paul, MN);
- $CO_2$ pure gas, Oxygen Service Company (St Paul, MN);
- $N_2$ pure gas, Oxygen Service Company (St Paul, MN).

Test Methods

The following test methods have been used in evaluating some of the Examples of the present disclosure.

Gas Permeability Test:

The Gas Permeability Test is used as an integrity test for the non-porous skin layer as well as a performance test for the hollow fiber membranes.

Loop modules were prepared by sealing hollow fibers together in a ¼" OD nylon tube with DP100 epoxy adhesive. Fiber lumen were exposed by cutting the sealing tube with a razor blade after at least partially curing. Each loop module contained 10 fibers with 4" (about 10.2 cm) effective length.

The Gas Permeability Test was conducted using a custom designed test stand. The stand was equipped with cylinders of pure gases ($CO_2$ and $N_2$), pressure gauges, and in-line gas flow meters. The principle of this testing is to supply a pure gas into fiber lumen and to measure the rate of the gas leaking through fiber walls into ambient environment. Both gas pressure and gas flow rate were monitored by a data acquisition software, and data are acquired when both pressure and gas flow are stabilized. Gas pressure in the fiber lumen was typically set at about 30 psi. Each fiber loop module was tested with $CO_2$ and $N_2$, respectively.

The gas permeation rate (GPU) of each fiber membrane was calculated as follows:

$$\text{Gas Permeation}\,(GPU) = \frac{Q}{\Delta P * A} * 10^6$$

wherein:

Q is the gas flow rate (scc/sec)

ΔP is the gas pressure differential reading (cm Hg)

A is the fiber outer surface area ($cm^2$)

The $CO_2/N_2$ selectivity of fibers was calculated from gas permeation rates of each gas using the following equation:

$$\text{Selectivity} = \frac{CO_2(GPU)}{N_2(GPU)}$$

The fiber gas selectivity has been used as an indicator of skin integrity. The selectivity of PMP is typically in the range 11-13 according to a literature report (*Polymer,* 1989, 30, 1357). Silicone gas selectivity is 10-12 (*Journal of Membrane Science,* 1991, 55, 131). Any fiber with gas Selectivity below 8 was considered to have a defective skin.

Optical Microscopy Test

The hollow fiber membrane precursor was imbedded in Epoxy adhesive (DP100 Plus) and cut into a short stub (<5 mm) after curing. The imbedded precursor was visualized under optical microscopy (Carl Zeiss "AXIO" stereo microscope, Pleasanton, CA) to measure fiber OD, thicknesses of fiber wall and each layer.

Scanning Electronic Microscopy (SEM) Test

The fiber sample was fillet with a razor blade to expose its interior surface, followed by imaging by Phenom Desktop SEM (NanoScience Instruments Company, AZ).

Apparatus and Methods

Apparatus for Making Co-Extruded Hollow Fiber Membranes

Dual-layer hollow fiber membrane precursors were coextruded through a two-orifice annular ring die with a center air hole (custom designed coextruded die) using two Haake Single Screw Extruder, available from ThermoFisher Scientific (Grand Island, NY). The substrate resin was extruded through a central core of the die, and the skin layer resin was extruded through the annular ring of the die.

After exiting the die, the molten hollow fiber was solidified through a quench ring and collected by passing the hollow fiber membrane precursor through motor driven Godet rollers and winding on a tension-controlled spooler.

Process for Making Co-Extruded Hollow Fiber Membranes

Hollow Fiber Membrane Precursor Extrusion

Skin layer resin (e.g., PDSP 15K) and porous substrate resin (e.g., PPH 3721) were fed into two single screw extruders. The porous substrate resin was extruded using a ¾" (1.91 cm) extruder with 24 L/D, and the skin layer resin was extruded using a ½" (1.27 cm) extruder with a smaller output. A 3-zone porous substrate resin extruder was controlled at temperatures ranging from 200° C. to 260° C. from zone 1 to zone 3, while the 3-zone skin layer extruder was controlled at temperatures ranging from 220° C. to 250° C. for zones 1 to 3. The extrusion die temperature was set at 220° C.-260° C.

The two molten resin streams were metered through by pumps into a two-orifice die (custom designed co-extruded die) with a center air hole. The two molten streams converged inside the die at the location <5 mm away from the die face. The orifices in the die were fine-tuned to maintain good concentricity to ensure the wall and layer uniformity of two-layer hollow fiber membranes. The extrusion rate of the skin layer resin was maintained significantly lower than the extrusion rate of the substrate resin in order to reduce the thickness of the skin layer.

A low volume air flow was supplied in the center hole to prevent fibers from either collapsing or over blowing. The molten fibers were solidified by passing through an air quench ring. The hollow fiber membrane precursor diameter was controlled by drawing down with motor-driven Godet rolls. The drawing speed was set in the range 50-100 meters per minute. The resultant hollow fiber membrane precursors were collected using a low-tension spooler.

Hollow Fiber Membrane Annealing

A 10" (25.4 cm) hollow fiber membrane precursor bundle was made with each end taped together using a high temperature tape. The bundle was annealed in a convection oven set at a temperature of 140° C.-160° C. The annealing time for each fiber membrane precursor bundle was 10 min.

Hollow Fiber Membrane Stretching (Cold/Hot) and Heat Setting

A bundle of well separated fibers was clamped in a temperature-controlled environmental chamber of an Instron Mechanical Tester (Model #1122, Morwood, MA). The fibers were cold-stretched at 25-45° C. and subsequently hot-stretched at 120-150° C. Total extension ratio was 45-105%. During the temperature ramp from cold to hot, the fibers were held under tension. No fiber relaxation was permitted after hot stretching. The fibers were released from the Instron Mechanical Tester after the chamber temperature was cooled to 40° C. or below. The specific process conditions used in the Examples and Comparative Examples are provided in Tables 1 and 2.

Comparative Example A

PMP-PO (Co)polymer/PMP-PO (Co)polymer Co-extruded Hollow Fiber Membrane in Comparative Example A, DX470 grade resin was used in the porous substrate, and MX002 grade resin was used in the skin layer to produce a co-extruded hollow fiber membrane precursor. Process conditions are provided in Tables 1 and 2.

After annealing and stretching, the micro-porous hollow fiber membrane gave both good $CO_2/N_2$ selectivity and $CO_2$ gas flux up to 35.9 GPU, as shown in Table 3.

TABLE 1

Process Conditions for Production of Hollow Fiber Membrane Precursors

| | Substrate Extruder | | Skin Layer Extruder | | | | |
|---|---|---|---|---|---|---|---|
| Example | Extruder Temp (° C.) | Melt pump output (cc/min) | Extruder Temp (° C.) | Melt Pump Output (cc/min) | Die Temp (° C.) | Winding Speed (m/min) | Precursor OD (μm) |
| Comparative Example A | 215-260 | 3.6 | 240-250 | 0.3 | 260 | 100 | — |
| Example 1 | 235-260 | 3.0 | 235-250 | 0.5 | 260 | 100 | 290 |
| Example 2 | 200-220 | 4.6 | 235-250 | 0.5 | 220 | 50 | 455 |
| Example 3 | 200-220 | 4.6 | 235-250 | 0.5 | 220 | 100 | 280 |
| Example 4 | 235-260 | 2.6 | 235-250 | 0.5 | 220 | 100 | 245 |
| Example 5 | 235-260 | 3.6 | 235-250 | 0.5 | 220 | 100 | 267 |
| Example 6 | 235-260 | 4.6 | 235-250 | 0.5 | 220 | 100 | 290 |

TABLE 2

Process Conditions for Hollow Fiber Membrane Annealing and Stretching

| | | Stretching | | | |
|---|---|---|---|---|---|
| Example | Annealing Anneal Temp. (° C.) | Cold Stretch Temp. (° C.) | Hot Stretch Temp. (° C.) | Total stretch (%) | Fiber Outer Diameter (μm) |
| Comparative A | 160 | 45 | 150 | 45 | — |
| Example 1 | 140 | 25 | 120 | 105 | 255 +/− 21 |
| Example 2 | 140 | 25 | 120 | 105 | 422 +/− 4 |
| Example 3 | 140 | 25 | 120 | 105 | 258 |
| Example 4 | 140 | 25 | 120 | 105 | 231 +/− 19 |
| Example 5 | 140 | 25 | 120 | 105 | 227 +/− 5 |
| Example 6 | 140 | 25 | 120 | 105 | 247 |

TABLE 3

Hollow Fiber Membrane Compositions, Gas Fluxes and $CO_2/N_2$ Selectivity

| Example | Skin Resin | Substrate Resin | $CO_2$ Gas Flux (FPU) | $CO_2/N_2$ Selectivity |
|---|---|---|---|---|
| Comparative A | MX004 | DX470 | 35.9 | 13.1 |
| Example 1 | PDSP 15K | PPH3271 | 693 +/− 162 | 6.5 +/− 1.5 |
| Example 2 | PDSP 15K | PPH3271 | 433 +/− 3 | 11.2 +/− 0.5 |
| Example 3 | PDSP 15K | PPH3271 | 784 +/− 79 | 10.8 +/− 1.1 |
| Example 4 | PDSP 15K | PPH3271 | 454 +/− 35 | 11.1 +/− 1.0 |
| Example 5 | PDSP 15K | PPH3271 | 552 +/− 9 | 11.2 +/− 0.6 |
| Example 6 | PDSP 15K | PPH3271 | 488 +/− 7 | 11.0 +/− 1.6 |

Examples 1-6

Co-extruded hollow fiber membranes were made with PDSP (15K) as the skin material and PPH3271 as the porous substrate material (Example 1-3). PDSP is an AB diblock copolymer with silicone segments and a polyoxamide linkage. The silicone segment molecular weight of the PDSP 15K used in the examples is 15K Dalton. The PDSP/PP co-extruded hollow fiber membranes in Examples 1-6 were processed in the same way as the PMP/PMP co-extruded hollow fiber membranes of Comparative Example A, except that different materials were used for both the skin layer and the porous substrate and various process conditions were used.

Process conditions for those membranes are provided in Table 1 and 2 and membrane compositions are provided in Table 3. Note that the PDSP skin became tacky under high temperature of annealing and hot stretching. The hollow fibers need to be well separated to prevent them from sticking to each other during processing. As a result, fiber skin defects could be avoided.

In Example 1, the PP substrate was extruded at 260° C. in both melt stream and extrusion die. The substrate melt stream had a similar processing temp as the skin melt stream. The PDSP/PP Co-extruded hollow fiber membrane gave excellent $CO_2$ gas flux (693 GPU) while the $CO_2/N_2$ selectivity is lower than 8, which was considered as the threshold number to indicate a good skin integrity.

In Examples 2-3, PP substrate was extruded at 220° C. in both melt stream and extrusion die while the substrate melt stream maintained at the same processing temp as one in Example 1. PDSP/PP co-extruded hollow fiber membrane precursor in Example 3 was wound in a faster speed than the precursor in Example 2. The resultant fiber membrane precursor in Example 3 is smaller in outside diameter as shown in Table 1.

FIG. 4A shows the visual image of the hollow fiber membrane precursor in Example 2. The PDSP skin was uniformly located on top of the PPH3271 substrate. FIG. 4B provides a second image of the nonporous PDSP copolymer skin on a porous PPH3271 substrate after dry stretching the hollow fiber membrane precursor. As can be seen, the PDSP skin is substantially free from defects and pores.

By those process condition changes, both PDSP/PP coextruded hollow fiber membranes after annealing and stretching resulted in both excellent $CO_2$ gas flux and good $CO_2/N_2$ selectivity (>10). Particularly, the membrane in Example 3 gave 784 GPU $CO_2$ gas flux, which is 21 times higher than the PMP/PMP coextruded hollow fiber membrane in Comparative Example A.

In Examples 4-6, PP substrate was extruded at 260° C. in melt stream with various substrate melt pump output but the co-extrusion die was controlled at 220° C. Processing conditions for the skin layer PDSP remained the same. Two interesting findings were observed from this set of experiments. First, controlling co-extrusion die temperature alone could improve dramatically $CO_2/N_2$ gas selectivity of the coextruded hollow fiber membranes in Examples 4-6, compared to the membrane in Example 1. Second, no dramatic $CO_2$ gas flux change was seen with increasing substrate melt pump output. That implies the skin layer is the determining factor for gas fluxes of coextruded hollow fiber membranes.

Figure 4C:
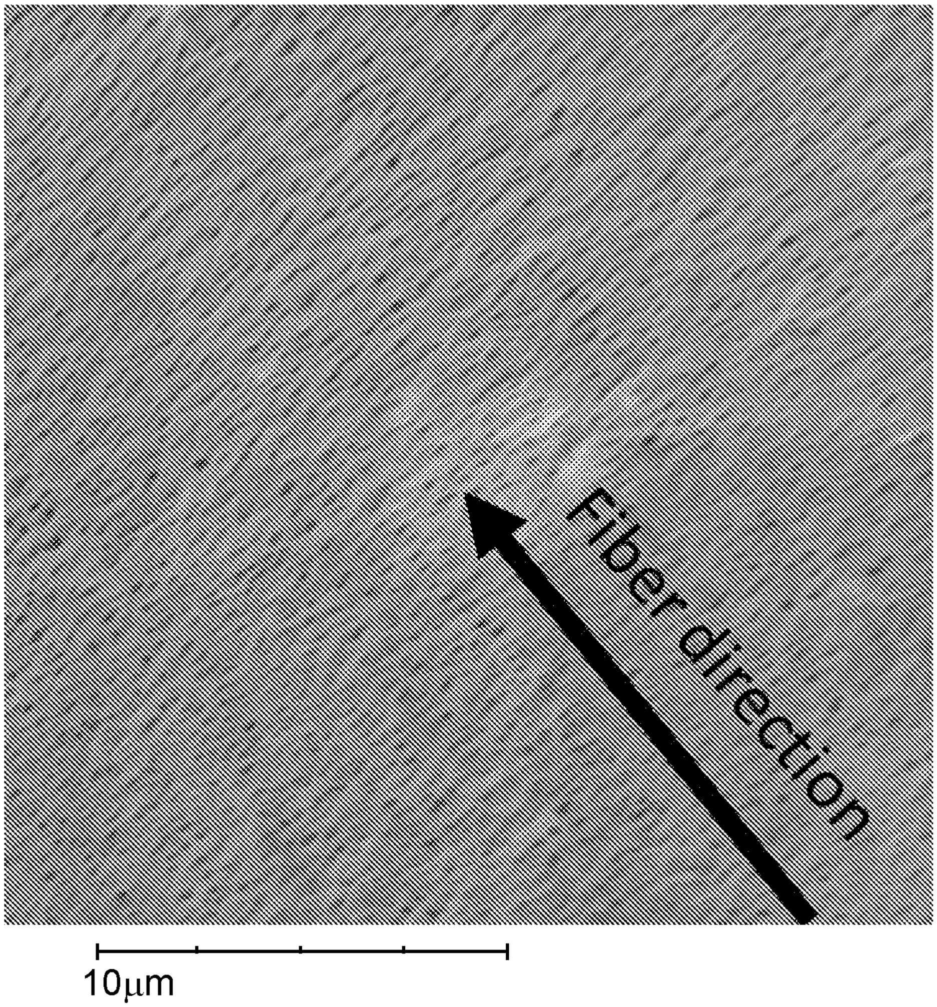
FIG. 4C is a micrograph obtained using scanning electron microscopy of a porous substrate of an exemplary hollow fiber membrane according to certain embodiments of the present disclosure.

Both PDSP/PP co-extruded hollow fiber membrane precursor and membrane in Example 4 was analyzed by optical microscope and scanning electron microscopy. Images are showed in FIGS. 2-4. FIG. 2 is cross-section of the PDSP/PP coextruded hollow fiber membrane precursor. The oval shape of fiber membrane precursor was caused by sample preparation. This fiber membrane precursor shows PDSP layer thickness of 8.3 μm and the PP substrate layer 26.0 um. FIG. 4C is cross-section of the hollow fiber membrane after annealing and stretching. Interestingly, stretching co-extruded hollow fiber caused little substrate layer thickness change (28.9 μm). However, the skin layer had dramatical change in in thickness while remaining a solid dense film; its thickness changed from 8.3 μm to 2.6 μm.

While not wishing to be bound by any particular theory, it is believed that the dry stretching process generated micropores in the substrate layer, and subsequently the material volume was expanded along the fiber direction and the density of the substrate layer was reduced. As a result, the dimension of fiber transverse direction could keep consistent. In contrast, mass or volume conservation applied to the skin layer since no pore is generated. The extension in the fiber direction may be compensated for by the reduced skin layer thickness.

This skin thinning out is beneficial to improve membrane gas fluxes by controlling its thickness. The pore morphologies of the PP substrate layer were further confirmed by imaging the fiber interior surface (FIG. 4C). A typical dry stretch membrane pore morphology is seen in the substrate layer including well oriented lamellae, and the micropores between by separated lamellae.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An asymmetric hollow fiber membrane comprising:

an artificial semi-permeable barrier in the form of an open tubular filament, the barrier comprising a porous substrate and a skin layer overlaying the porous substrate, wherein the skin layer comprises an outer sheath surface of the asymmetric hollow fiber membrane;

wherein, the barrier surrounds an internal lumen, the porous substrate has a plurality of pores and comprises at least one semi-crystalline thermoplastic polyolefin (co)polymer; and the skin layer comprises at least one polydiorganosiloxane polyoxamide copolymer comprising at least two repeat units of Formula I:

I

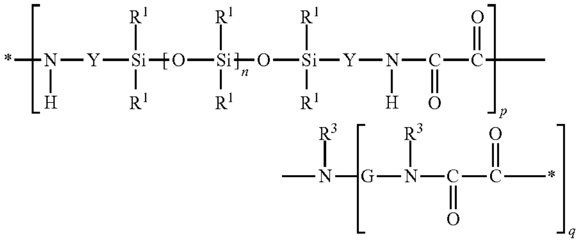

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula R3HN-G-NHR3 minus the two —NHR3 groups;

$R^3$ is hydrogen or alkyl or $R^3$ taken together with G and to the nitrogen to which they are both attached form a heterocyclic group;

n is independently an integer of 1 to 1500;

p is an integer of 1 to 10; and q is an integer of 1 or greater, wherein n, p and q are selected so that the polydiorganosiloxane block comprises at least 50 mass percent of the polydiorganosiloxane polyoxamide copolymer.

2. The asymmetric hollow fiber membrane of claim 1, wherein at least 50 percent of the $R^1$ groups are methyl.

3. The asymmetric hollow fiber membrane of claim 1, wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms;

G is an alkylene, heteroalkylene, arylene, aralkylene, polydiorganosiloxane, or a combination thereof; and $R^3$ is H or methyl.

4. The asymmetric hollow fiber membrane of claim 1, wherein n is at least 40.

5. The asymmetric hollow fiber membrane of claim 1, wherein the porous substrate comprises an internal lumen surface of the asymmetric hollow fiber membrane.

6. The asymmetric hollow fiber membrane of claim 1, wherein the skin layer comprises an internal lumen surface of the asymmetric hollow fiber membrane.

7. The asymmetric hollow fiber membrane of claim 1, wherein the semi-crystalline thermoplastic polyolefin (co) polymer comprises polyethylene, polypropylene, polymethylpentene, or a combination thereof.

8. The asymmetric hollow fiber membrane of claim 1, wherein the plurality of pores comprises a plurality of micropores, wherein the plurality of micropores has a diameter of from 0.01 micrometer to 1.0 micrometer.

9. The asymmetric hollow fiber membrane of claim 1, wherein the asymmetric hollow fiber membrane exhibits a porosity of from 5% to 80%.

10. The asymmetric hollow fiber membrane of claim 1, wherein the skin layer is less porous than the porous substrate and comprises an outer sheath surface of the asymmetric hollow fiber membrane.

11. The asymmetric hollow fiber membrane of claim 10, wherein the skin layer is nonporous.

12. The asymmetric hollow fiber membrane of claim 1, wherein the skin layer has a thickness of less than 20 micrometers.

13. The asymmetric hollow fiber membrane of claim 1, wherein the porous substrate has a thickness of from 5 micrometers to 200 micrometers.

14. A separation article comprising a plurality of the asymmetric hollow fiber membranes according to claim 1 arranged parallel in an array pattern and fastened together.

15. The separation article of claim 14, wherein the array is pleated, folded, or rolled into a cylinder or a cassette.

16. The separation article of claim 14, wherein the separation article is selectively permeable to $CO_2$ over $N_2$, $CO_2$ over $CH_4$, water vapor over air, or one or more volatile organic compounds over air.

17. The separation article of claim 16, wherein the separation article exhibits a $CO_2/N_2$ or $CO_2/CH_4$ selectivity of at least 8.

18. A method of making an asymmetric hollow fiber membrane comprising:

providing a substrate resin and a skin layer resin, the substrate resin comprising at least one semi-crystalline thermoplastic polyolefin (co)polymer, and the skin layer resin comprising at least one polydiorganosiloxane polyoxamide copolymer comprising at least two repeat units of Formula I:

I

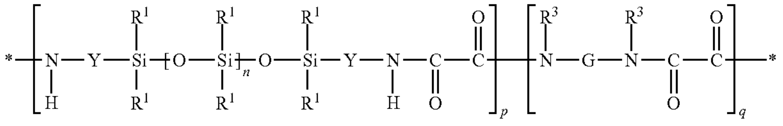

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is a divalent residue equal to a diamine of formula $R^3HN$-G-$NHR^3$ minus the two —$NHR^3$ groups;

$R^3$ is hydrogen or alkyl or $R^3$ taken together with G and to the nitrogen to which they are both attached form a heterocyclic group;

n is independently an integer of 1 to 1500;

p is an integer of 1 to 10; and q is an integer of 1 or greater, wherein n, p and q are selected so that the polydiorganosiloxane block comprises at least 50 mass percent of the polydiorganosiloxane polyoxamide copolymer;

co-extruding the substrate resin and the skin layer resin to form an asymmetric hollow fiber membrane precursor; and stretching the asymmetric hollow fiber membrane precursor to form the asymmetric hollow fiber membrane comprising a barrier layer surrounding an internal lumen, wherein the barrier layer comprises a nonporous skin layer comprised of the skin layer resin overlaying a porous substrate comprised of the substrate resin, wherein the porous substrate comprises a plurality of pores.

19. The method of claim 18, further including annealing the asymmetric hollow fiber membrane precursor.

* * * * *